United States Patent
Dang et al.

(10) Patent No.: US 11,777,669 B2
(45) Date of Patent: Oct. 3, 2023

(54) ELECTRONIC APPARATUS AND METHOD FOR WIRELESS COMMUNICATION NETWORK CONTROL END AND NETWORK NODE

(71) Applicant: Sony Corporation, Tokyo (JP)

(72) Inventors: Jian Dang, Nanjing (CN); Weiwen Chu, Nanjing (CN); Penshun Lu, Beijing (CN)

(73) Assignee: SONY CORPORATION, Tokyo (JP)

( * ) Notice: Subject to any disclaimer, the term of this patent is extended or adjusted under 35 U.S.C. 154(b) by 662 days.

(21) Appl. No.: 16/491,160

(22) PCT Filed: Mar. 5, 2018

(86) PCT No.: PCT/CN2018/077981
§ 371 (c)(1),
(2) Date: Sep. 5, 2019

(87) PCT Pub. No.: WO2018/177077
PCT Pub. Date: Oct. 4, 2018

(65) Prior Publication Data
US 2021/0409168 A1    Dec. 30, 2021

(30) Foreign Application Priority Data
Mar. 27, 2017    (CN) .......................... 201710188913.4

(51) Int. Cl.
*H04L 1/00* (2006.01)
*H04L 1/1867* (2023.01)
(Continued)

(52) U.S. Cl.
CPC .......... *H04L 1/1887* (2013.01); *H04L 1/1607* (2013.01); *H04L 1/187* (2013.01); *H04L 1/1893* (2013.01); *H04L 5/0044* (2013.01)

(58) Field of Classification Search
CPC ..... H04L 1/1887; H04L 1/1607; H04L 1/187; H04L 1/1893; H04L 5/0044; H04L 1/16;
(Continued)

(56) References Cited

U.S. PATENT DOCUMENTS 8,681,704 B2 * 3/2014 Park ...................... H04L 1/1848
370/336
8,964,673 B2 * 2/2015 Chung .................. H04L 1/1671
714/748
(Continued)

FOREIGN PATENT DOCUMENTS

CN    101682483 A    3/2010
CN    105306177 A    2/2016
(Continued)

OTHER PUBLICATIONS

International Search Report and Written Opinion dated Jul. 13, 2018 for PCT/CN2018/077981 filed on Mar. 5, 2018, 8 pages including English Translation of the International Search Report.

*Primary Examiner* — Albert Decady
*Assistant Examiner* — Osman M Alshack
(74) *Attorney, Agent, or Firm* — XSENSUS LLP

(57) ABSTRACT

Provided in the present disclosure are an electric apparatus and method for a wireless communication network control end, and electronic apparatus and method for a wireless communication network node. The electronic apparatus for the wireless communication network control end includes a processing circuit. The processing circuit is capable of determining how to divide wireless communication transmission resources in a predetermined domain, the divided transmission resources being employed for first-time transmission and re-transmission of a network node, respectively. The processing circuit is also capable of generating configuration information containing information of a dividing
(Continued)

manner of the wireless communication transmission resources.

19 Claims, 16 Drawing Sheets

(51) Int. Cl.
    *H04L 1/1607*     (2023.01)
    *H04L 5/00*     (2006.01)

(58) Field of Classification Search
    CPC ........... H04L 1/18; H04L 5/00; H04L 5/0005; H04W 74/08; H04W 74/085
    USPC .......................................... 714/726, 748–750
    See application file for complete search history.

(56) References Cited

U.S. PATENT DOCUMENTS

| | | | | |
|---|---|---|---|---|
| 2009/0070650 | A1* | 3/2009 | Bourlas | H04W 72/0466 714/748 |
| 2009/0327830 | A1* | 12/2009 | Lee | H04L 1/1887 714/E11.113 |
| 2010/0074200 | A1* | 3/2010 | Li | H04L 1/1822 370/329 |
| 2011/0246846 | A1* | 10/2011 | Ojala | H04L 1/1887 714/748 |
| 2011/0274024 | A1* | 11/2011 | Liu | H04B 1/69 370/336 |
| 2014/0321314 | A1* | 10/2014 | Fodor | H04W 72/542 370/252 |
| 2015/0327275 | A1* | 11/2015 | Kwon | H04L 5/001 370/236 |
| 2016/0049997 | A1* | 2/2016 | Onodera | H04B 7/0452 370/329 |
| 2016/0212768 | A1* | 7/2016 | Wentink | H04W 16/14 |
| 2017/0034799 | A1* | 2/2017 | Kim | H04W 56/003 |
| 2017/0041971 | A1* | 2/2017 | Kim | H04W 76/14 |
| 2017/0311339 | A1* | 10/2017 | Xu | H04W 36/0058 |
| 2018/0242356 | A1* | 8/2018 | Wu | H04W 74/08 |
| 2019/0013903 | A1* | 1/2019 | Zhang | H04L 5/0055 |

FOREIGN PATENT DOCUMENTS

| | | |
|---|---|---|
| CN | 106165482 A | 11/2016 |
| WO | 2016/163690 A1 | 10/2016 |

* cited by examiner

ELECTRONIC APPARATUS AND METHOD FOR WIRELESS COMMUNICATION NETWORK CONTROL END AND NETWORK NODE

CROSS-REFERENCE TO RELATED APPLICATIONS

The present application is based on PCT filing PCT/CN2018/077981, filed Mar. 5, 2018, which claims the priority to Chinese Patent Application No. 201710188913.4, titled "ELECTRONIC APPARATUS AND METHOD FOR WIRELESS COMMUNICATION NETWORK CONTROL END AND NETWORK NODE", filed on Mar. 27, 2017 with the China National Intellectual Property Administration, the entire contents of each are incorporated herein by reference.

FIELD OF THE DISCLOSURE

Embodiments of the present disclosure generally relate to the field of wireless communications, in particular to random access and collision resolution technologies, and more particularly to an electronic apparatus and a method for a network control terminal in wireless communications, and an electronic apparatus and a method for a network node in wireless communications.

BACKGROUND OF THE DISCLOSURE

The current 5G application scenarios are divided into three categories: enhanced mobile broadband (eMBB), massive machine type communication (mMTC), and ultra-reliable low-latency communication (uRLLC). These three application scenarios have different requirements. For example, the eMBB scenario requires low latency and high spectral efficiency, while the mMTC scenario requires handling a large number of accessed terminals and achieving low power consumption. In the mMTC scenario, how to resolve collision and re-transmission problems becomes very important due to random access of a large number of users.

SUMMARY OF THE DISCLOSURE

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for a network control terminal in wireless communications is provided. The electronic apparatus includes processing circuitry, configured to: determine a division manner of transmission resources for the wireless communications in a predetermined domain, divided transmission resources being used for initial data transmission of a network node and data re-transmission of the network node, respectively; and generate configuration information containing information on the division manner.

According to another aspect of the present disclosure, an electronic apparatus for a network node in wireless communications is provided. The electronic apparatus includes processing circuitry, configured to: acquire configuration information containing information on a division manner of transmission resources for the wireless communications in a predetermined domain, wherein divided transmission resources are used for initial data transmission of the network node and data re-transmission of the network node, respectively; and perform the initial data transmission or the data re-transmission based on the configuration information.

According to another aspect of the present disclosure, a method for a network control terminal in wireless communications is provided. The method includes: determining a division manner of transmission resources for the wireless communications in a predetermined domain, divided transmission resources being used for initial data transmission of a network node and data re-transmission of the network node, respectively: and generating configuration information containing information on the division manner.

According to another aspect of the present disclosure, a method for a network node in wireless communication is provided. The method includes: acquiring configuration information containing information on a division manner of transmission resources for the wireless communications in a predetermined domain, wherein divided transmission resources are used for initial data transmission of the network node and data re-transmission of the network node, respectively; and performing the initial data transmission or the data re-transmission based on the configuration information.

According to other aspects of the present disclosure, there are further provided computer program codes and computer program products for implementing the methods above, and a computer readable storage medium having recorded thereon the computer program codes for implementing the methods described above.

With the electronic apparatus and the method according to the present disclosure, the transmission resources are divided into a portion for initial data transmission of the network node and a portion for data re-transmission of the network node, so that the number of network nodes whose transmission is successful can be effectively increased, thereby supporting bursting access of a large number of users.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

As mentioned above, in an mMTC scenario, there may be a large number of network nodes randomly accessing into a network control terminal. In this application scenario, there is a high probability that a collision occurs and re-transmission is required. Therefore, how to deal with collision problems is critical to the improvement of communication quality. A technology for reducing collisions and increasing the number of network nodes whose transmission is successful is provided in this embodiment. However, it should be understood that the application scenario of the technology of this embodiment is not limited to the mMTC, and the technology of this embodiment may be applied to any scenario having similar requirements, and the mMTC is merely an example given for the purpose of understanding.

Figure 1:
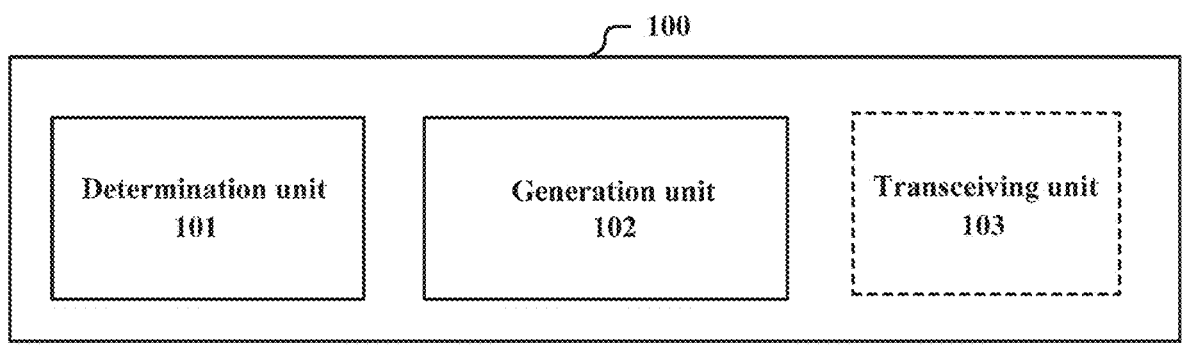
FIG. 1 is a block diagram showing functional modules of an electronic apparatus for a network control terminal in wireless communications according to an embodiment of the present disclosure.

FIG. 1 shows block diagram of functional modules of an electronic apparatus 100 for a network control terminal in wireless communications according to an embodiment of the present disclosure. As shown in FIG. 1, the electronic apparatus 100 includes a determination unit 101 and a generation unit 102. The determination unit 101 is configured to determine a division manner of transmission resources for the wireless communications in a predetermined domain. Divided transmission resources are used for initial data transmission of a network node and data re-transmission of the network node, respectively. The generation unit 102 is configured to generate configuration information including information on the division manner.

The determination unit 101 and the generation unit 102 may be implemented by one or more processing circuitries, which may be implemented, for example, as a chip.

The network control terminal may be an entity in a communication system for implementing functions such as relevant setting, control, and communication resources allocation for the communication activities, for example, a base station in a cellular communication system, and a baseband cloud device under a Cloud-RAN/Centralized-RAN (C-RAN) architecture (in which a cell may not exist), such as any BBUs that are in high speed communication with each other in a BBU pool under the C-RAN architecture. The network node may be an entity that achieves its communication object by using communication resources in a communication system, for example, various user equipments (such as mobile terminals, smart vehicles, smart wearable devices having a cellular communication capability) or network infrastructures such as a small cell base station.

Generally, the network node and the network control terminal perform data transmission on a specific transmission resource for the purpose of communication. For example, in a case that the network control terminal does not correctly receive data from the network node, the network node performs data re-transmission. In different communication schemes, multiple network nodes may perform data transmission on mutually orthogonal transmission resources, i.e., using an Orthogonal Multiple Access (OMA) technology: or may perform the data transmission using non-orthogonal transmission resources, i.e., using a Non-orthogonal Multiple Access (NOMA) technology. On the other hand, the data transmission between the network node and the network control terminal may be grant-based, that is, the network control terminal schedules transmission resources for the network node and grants the use of the transmission resources. The data transmission between the network node and the network control terminal may also be grant-free, that is, the network node directly performs data transmission without the grant of the network control terminal. Depending on the property of the data to be transmitted, the grant-free manner and the NOMA technology may be more suitable for the mMTC scenario. Therefore, the scenario of employing the grant-free manner and the NOMA technology is mainly described in the following, but it should be understood that the technology of the present disclosure is not limited thereto, and may be suitably applied to a scenario employing the grant-based manner and/or the OMA technology.

In this embodiment, the determination unit 101 divides the transmission resources into two categories in a predetermined domain, which are used for initial data transmission of the network node and data re-transmission of the network node, respectively. In this way, accumulation of re-transmission data can be avoided, thereby increasing the probability of successful transmission of the network node. As an example, the transmission resources for the initial data transmission of the network node and the transmission resources for the data re-transmission of the network node may be distributed in the predetermined domain alternately. The generation unit 102 generates information on how the transmission resources are divided as configuration information. The configuration information is provided to the network node, so that the network node performs the initial data transmission and the data re-transmission according to the configuration information.

As shown by a dashed line block in FIG. 1, the electronic apparatus 100 may further include: a transceiving unit 103, configured to transmit the configuration information to the network node. The transceiving unit 103 may be implemented, for example, as a transceiver or an antenna, and associated components thereof.

The transceiving unit 103 may transmit the configuration information to respective network nodes by means of broadcast. For example, the transceiving unit 103 may perform transmission via Broadcast Channel (BCH) or system information broadcast such as System Information Blocks (SIB), where the SIB may be transmitted on Downlink Share Channel (DL-SCH), and the DL-SCH and the BCH may be respectively mapped to Physical Downlink Share Channel (PDSCH) and Physical Broadcast Channel (PBCH). Next, the network node may perform data transmission according to the configuration information. For example, the network node performs first transmission of data using the transmission resources for the initial data transmission, and performs re-transmission of the data using the transmission resources for the data re-transmission after the first transmission fails.

The predetermined domain may include one of a time domain, a frequency domain, and a code domain. In other words, the predetermined domain is one of domains in which the transmission resources are distributed. By dividing the transmission resources in the predetermined domain, the initial transmission data and the re-transmission data can be distinguished from each other in the predetermined domain, so that the probability of collision or overload of data from different network nodes can be reduced, thereby effectively increasing the number of network nodes whose transmission is successful.

In an example, the predetermined domain is the time domain, and the determination unit 101 is configured to divide time-frequency resources into multiple double windows in the time domain. Each double window includes a transmission window for the initial data transmission of the network node and a back-off window for the data re-transmission of the network node. The back-off window is used for data re-transmission by the network node whose transmission fails in the transmission window of the current double window. In addition, the back-off window may further be used for data re-transmission by the following network nodes: at least a part of network nodes whose re-transmission fail in the back-off window of a previous double window. Therefore, in this example, the back-off window is a time window for data re-transmission by a network node whose transmission fails after the network node performs back-off.

The transmission resources that may be used by the network node are collectively referred to as a resource pool. The resource pool may be divided into multiple minimum time-frequency resource units (hereinafter simply referred to as Resource Units (RUs)), and the network node may select an RU to perform data transmission. The RUs are independent of each other. The RUs occupy a part of subframes in the time domain, and occupy a part of subcarriers in the frequency domain, as shown by squares in FIG. 2. The size of the RU is pre-configured by the network control terminal.

Figure 3:
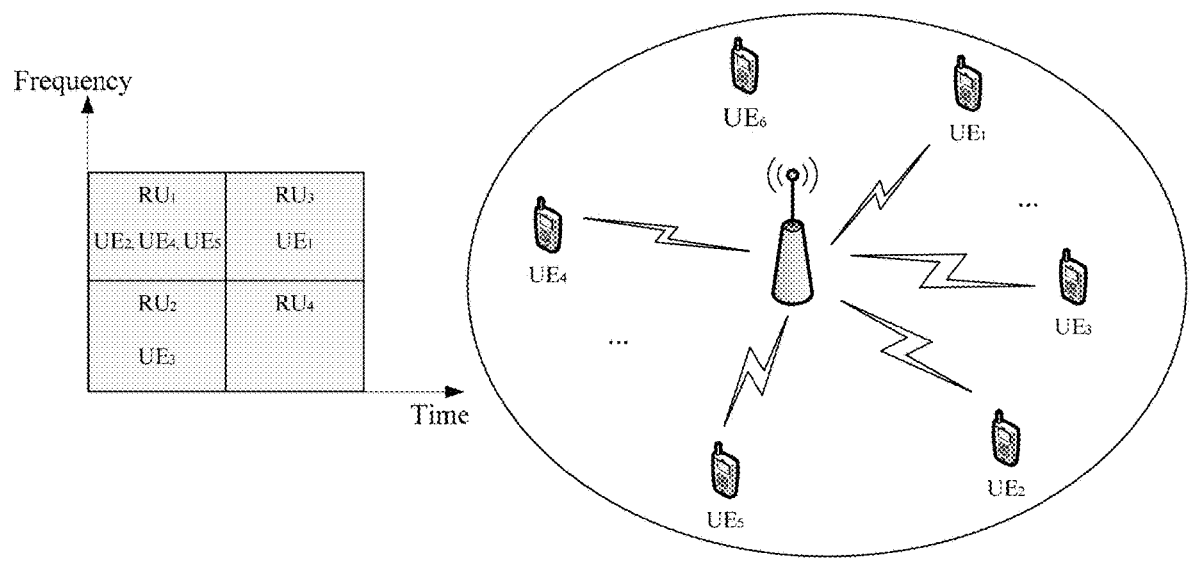
FIG. 3 is a schematic diagram showing an application scenario of a non-orthogonal multiple access technology.

In an uplink NOMA system, each RU may support multiple network nodes, as shown in FIG. 3, in which four RUs are shown. A network node distributed on an RU is different from a network node distributed on another RU (user equipment UE is taken as an example of the network node in FIG. 3). The number of network nodes that each RU can support depends, for example, on characteristics of an employed non-orthogonal multiple access technology. For example, in an Interleave division multiple access (IDMA) system, under the same signal-to-noise ratio, the longer the length of spreading spectrum is or the larger the number of receiving antennas is, the larger the number of network nodes that can be supported is. Therefore, for the same non-orthogonal multiple access technology, the sizes of the transmission window and back-off window determine the number of network nodes that can be supported. For example, in the example shown in FIG. 3, if each RU can support two network nodes, a collision or conflict occurs between three UEs using $RU_1$ simultaneously, resulting in re-transmission of data.

In this example, the determination unit 101 may determine configuration of a minimum time-frequency resource unit in the transmission window and the back-off window, such as the number of minimum time-frequency resource units respectively included in the transmission window and the back-off window. The network node randomly selects the minimum time-frequency resource unit in the transmission window to perform the initial data transmission or randomly selects the minimum time-frequency resource unit in the back-off window to perform the data re-transmission. The configuration is included in the configuration information generated by the generation unit 102 and is provided to the network node.

For example, the determination unit 101 may determine the configuration of the minimum time-frequency resource unit in the transmission window and the back-off window according to the average number of network nodes, and the configuration may be fixed. Further, the determination unit 101 may also change the configuration according to a change in the number of network nodes or requirements of the network nodes in a real-time manner. The generation unit 102 correspondingly generates updated configuration information. The transceiving unit 103 transmits the updated configuration information to the network nodes, for example, by means of broadcast. In some examples, only the size of the back-off window is updated, while the size of the transmission window is set to be fixed. The setting of the double window and the update of the back-off window are described below by way of specific examples.

Figure 2:
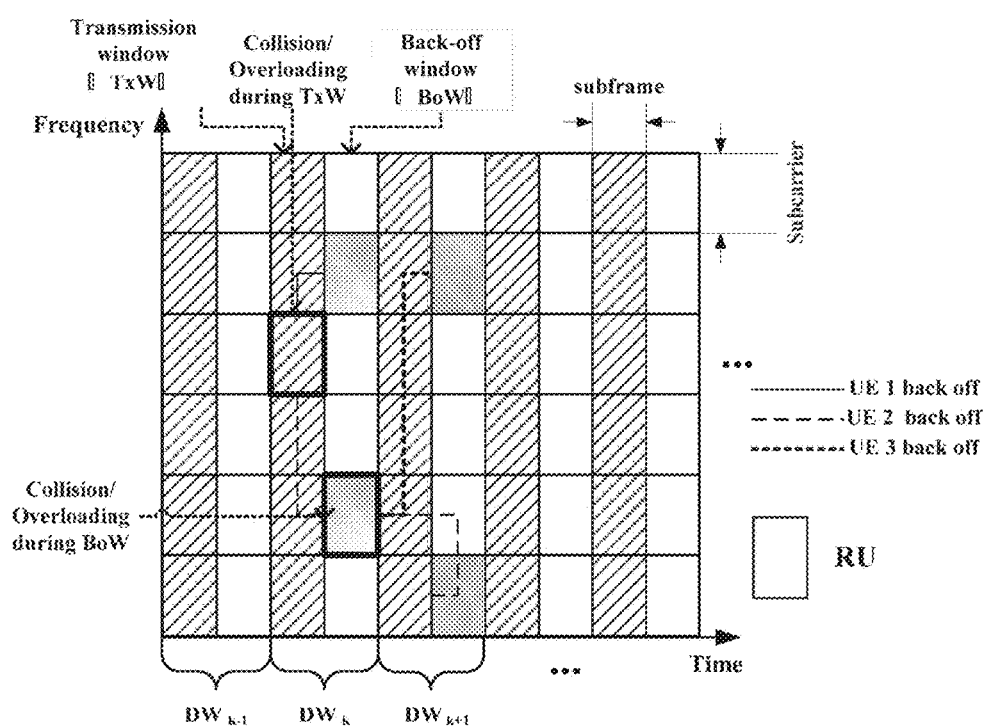
FIG. 2 is a schematic diagram showing an example of a double window in a time domain according to an embodiment of the present disclosure.

In this embodiment, the back-off window for data re-transmission and the transmission window for initial data transmission are separated in the time domain. FIG. 2 is a schematic diagram showing an example of a double window in a time domain according to an embodiment of the present disclosure. A square filled with diagonal lines represents a transmission window (TxW), and a blank square represents a back-off window (BoW). It can be seen that the transmission window and the back-off window are alternately distributed, and the transmission window in a certain double window is in front of the back-off window in this double window. As previously mentioned, the sizes of the transmission window and the back-off window are determined by the determination unit 101. The example shown in FIG. 2 is merely exemplary and is not limiting. In FIG. 2, the user equipment (UE) is taken as an example of a network node, and the base station (BS) is taken as an example of a network control terminal.

As shown in FIG. 2, in the transmission window TxW, the UE that accesses into the network and performs first data transmission transmits new data on a randomly selected RU. For example, the UE performs the transmission by containing the new data in a data packet, and the data packet further includes dedicated information for decoding. The dedicated information is determined by the employed non-orthogonal multiple access technology. For example, in the case of employing the IDMA technology, the dedicated information for decoding may include interleaver information. The base station detects whether there is a user on each RU by energy detection. If there is a user, the base station detects data and the number of users on each RU by using a blind detection algorithm, and demodulates received data.

If the base station can correctly demodulate data from a certain UE, data transmission of the UE is successful, otherwise the transmission is failed, and the UE needs to perform data re-transmission. The failed transmission may be caused, for example, due to collision or overload. In the case of successful transmission, if the UE still has new data to transmit, transmission of the new data is performed in a next transmission window. If there is no new data to be transmitted, the UE enters a sleep state. In the case of failed transmission, the UE reselects an RU for data transmission. As shown in FIG. 2, the UE performs data re-transmission in the back-off window BoW. The UE may select an RU in a same frequency or different frequency as the RU utilized in the initial transmission to perform data re-transmission.

In an example, the generation unit 102 generates indication information specific to a group of network nodes according to a demodulation result for the data from the network node, to notify the network nodes in the group of network nodes of whether data transmission is successful, where the network nodes utilizing the same minimum time-frequency resource unit to perform the data transmission constitute the group of network nodes. If there is a network node in the group of network nodes whose data is not successfully demodulated, the generation unit 102 generates indication information NACK specific to the group of network nodes and indicating that the data transmission is unsuccessful. Otherwise, the generation unit 102 generates indication information ACK specific to the group of network nodes and indicating the data transmission is successful.

Since no connection is established between a network control terminal and a network node in a grant-free communication system, the NACK or ACK transmitted by the network control terminal is specific to the RU, rather than specific to a certain network node. The transceiving unit 103 transmits the NACK or ACK specific to the RU to the network nodes by means of broadcast. For example, the transmission is performed on the DL-SCH through the SIB. The network nodes utilizing the RU will receive the corresponding NACK or ACK. In the case of receiving the NACK, the network nodes in the group of network nodes perform data re-transmission in the back-off window. It should be understood that the back-off window described herein may be a back-off window corresponding to a current transmission window, or may be a back-off window in a subsequent double window.

Still referring to FIG. 2, in the transmission window TxW of the double window $DW_k$, a UE1, a UE2, and a UE3 using a same RU constitute a group of users (i.e., the group of network nodes) whose transmission fail, for example, due to collision or overload. The group of users needs to perform re-transmission in the back-off window BoW after the transmission window. A re-transmission scheme using frequency reselection is shown in FIG. 2, in which the UE1, the UE2, and the UE3 may select RUs of different frequencies for re-transmission. For example, a UE may randomly select an RU of a certain frequency, even with equal probability. The UE1 selects the upper RU in the BoW shown in FIG. 2 to perform re-transmission, and the UE2 and the UE3 select the lower RU in the BoW shown in FIG. 2 to perform re-transmission. It should be understood that this is not limiting, and one or more of the UE1, the UE2, and the UE3 may also use a frequency in the BoW, which is same as the frequency used in the TxW.

In the BoW, the re-transmission of the UE1 is successful, and the re-transmission of the UE2 and the UE3 using the same RU fails. Therefore, the UE2 and the UE3 need to perform the re-transmission again in a next back-off window, i.e., the BoW of the $DW_{k+1}$. In the example of FIG. 2, the re-transmission scheme using frequency reselection is still employed.

Figure 4:
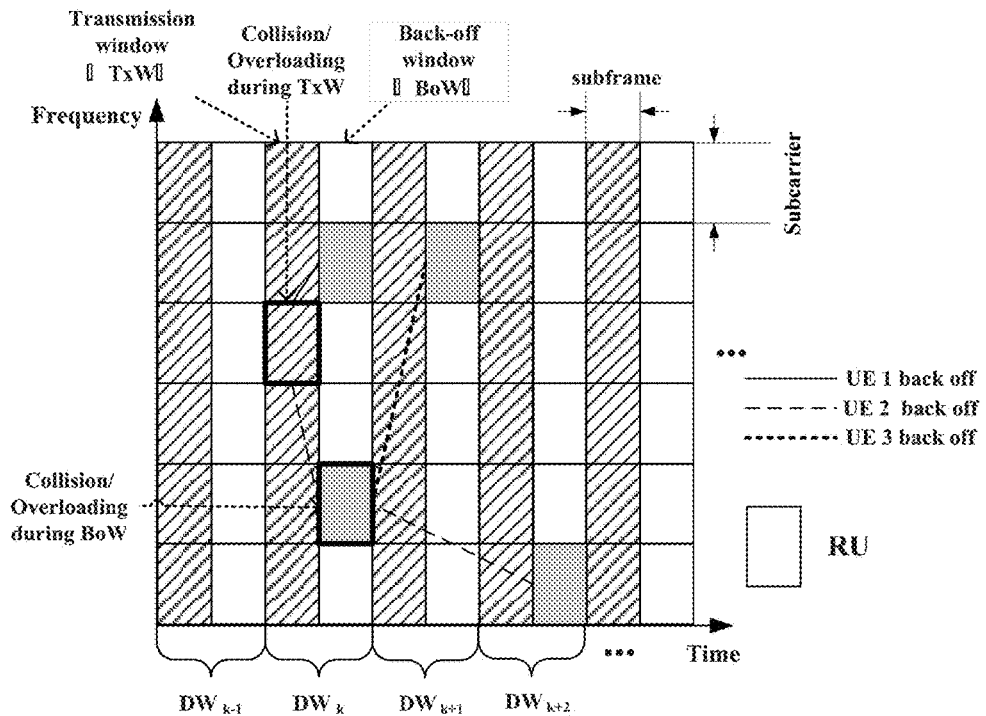
FIG. 4 is a schematic diagram showing an example of a double window in a time domain according to an embodiment of the present disclosure.

In the example of FIG. 2, the network nodes whose re-transmission fails in the BoW of the $DW_k$ all perform the re-transmission again in the next back-off window, i.e., the BoW of the $DW_{k+1}$. This is not limiting, and the network nodes may also select a back-off window used for performing the re-transmission again, that is, employing a re-transmission scheme using time-frequency reselection. FIG. 4 shows a schematic diagram of an example of a double window employing the re-transmission scheme using time-frequency reselection. It can be seen that FIG. 4 differs from FIG. 2 in that the UE2 and the UE3 whose re-transmission fails in the BoW of the $DW_k$ respectively select the BoW of the $DW_{k+2}$ and the BoW of the $DW_{k+1}$ to perform data re-transmission.

In an example, the generation unit 102 is further configured to generate a maximum back-off window size for a group of network nodes whose data transmission in the back-off window is unsuccessful. The maximum back-off window size indicates the maximum number of back-off windows for which the network node in the group of network nodes is capable of backing off. Information on the maximum back-off window size may be transmitted to the corresponding network node together with the NACK. The transmission may be performed by means of broadcast, for example, via system information broadcast on DL-SCH or BCH broadcast.

The network node may randomly select the number of back-off windows to back off within a range of the maximum back-off window size for example, or may select the number of back-off windows to back off according to a priority level of the network node, so that the network nodes that are to perform re-transmission are dispersed into multiple back-off windows, thereby avoiding the accumulation of data and increasing the probability of successful re-transmission.

For example, the maximum back-off window size may be set to be positively correlated to the number of the network nodes whose data transmission in the back-off window is unsuccessful. In this way, in a case that there are many network nodes whose data transmission in the back-off window is unsuccessful, a large maximum back-off window size may be set, so that the transmission of these network nodes can be distributed over a long time range. Further, the setting of the maximum back-off window size can also prevent the network node from waiting for too long time.

Furthermore, as previously described, the determination unit 101 may further be configured to dynamically adjust a size of the back-off window. For example, the determination unit 101 may adjust the size of the back-off window according to the number of network nodes that are to perform data re-transmission in the current back-off window. The network nodes that are to perform data re-transmission include network nodes whose transmission in the current transmission window fails. Since the number of these network nodes reflects the load size in the back-off window, the size of the back-off window may be adjusted according to the number. In other examples, the network nodes that are to perform re-transmission may further include network nodes whose re-transmission in the previous back-off window fails and thus back off to the current back-off window. It can be understood that, in the case that the number of network nodes that are to perform data re-transmission is large, the size of the back-off window may be appropriately increased, that is, the amount of transmission resources used for re-transmission is increased. Otherwise the size of the back-off window is appropriately reduced, that is, the amount of transmission resources used for re-transmission is reduced.

Alternatively or additionally, the determination unit 101 may also adjust the size of the back-off window according to requirements of the network nodes. The requirement information of a network node is included, for example, in a data packet transmitted from the network node to the network control terminal. The requirements of the network nodes include, for example, the need to transmit data as quickly as possible, the low tolerance to delay or the like. In a case that there is such a network node with special requirements, the determination unit 101 may appropriately increase the size of the back-off window, thereby increasing the probability of successful re-transmission of such kind of network nodes.

After the determination unit 101 adjusts the size of the back-off window, the generation unit 102 generates corresponding updated configuration information, and the transceiving unit 103 transmits the updated configuration information to the network node. The updated configuration information is used to update the size of the current back-off window. In this case, the updated configuration information is transmitted in, for example, the current transmission window by means of broadcast, for example, via system information broadcast on DL-SCH or BCH broadcast.

Figure 5:
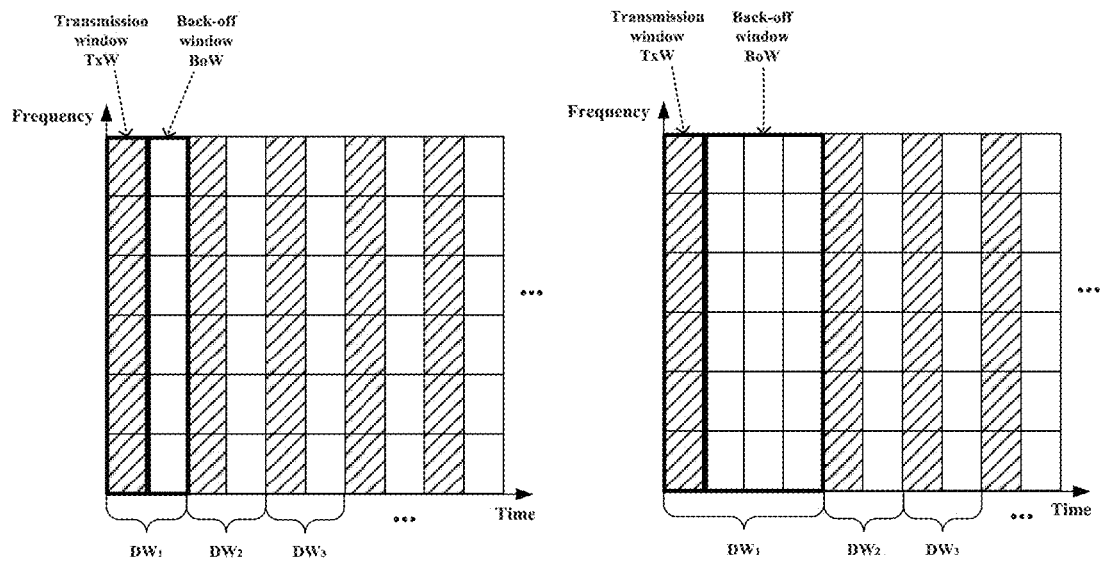
FIG. 5 is a diagram showing an example of a back-off window before and after being updated.

FIG. 5 is a diagram showing an example of a back-off window before and after being updated. The left portion of FIG. 5 shows a transmission window TxW and a back-off window BoW before the update, where the TxW lasts for one time slot, i.e., a time length of one RU, which is expressed as TxW=1. The BoW also lasts for a time length of one RU, which is expressed as BoW=1. The right portion of FIG. 5 shows the updated back-off window, where BoW=3, and the transmission window TxW remains unchanged. It can be seen that if there are N optional RUs in the back-off window before the update, there are 3N optional RUs in the updated back-off window, so that the number of available RUs is increased, thereby effectively alleviating the collision problem due to resource contention. It should be understood that the determination unit 101 may also similarly adjust the size of the transmission window TxW if necessary.

Further, in FIG. 5, the size of the back-off window becomes 1 in and after a next double window $DW_2$, which may be implemented by the transceiving unit 103 transmitting corresponding configuration information again or by automatically performing operation of restoring to initial settings by the network node. Alternatively, the network node may be configured to perform data transmission according to the configuration indicated by the most recently received configuration information, if no new configuration information is received. In the example of FIG. 5, for example, the size of the BoW may be maintained to be BoW=3.

Figure 6:
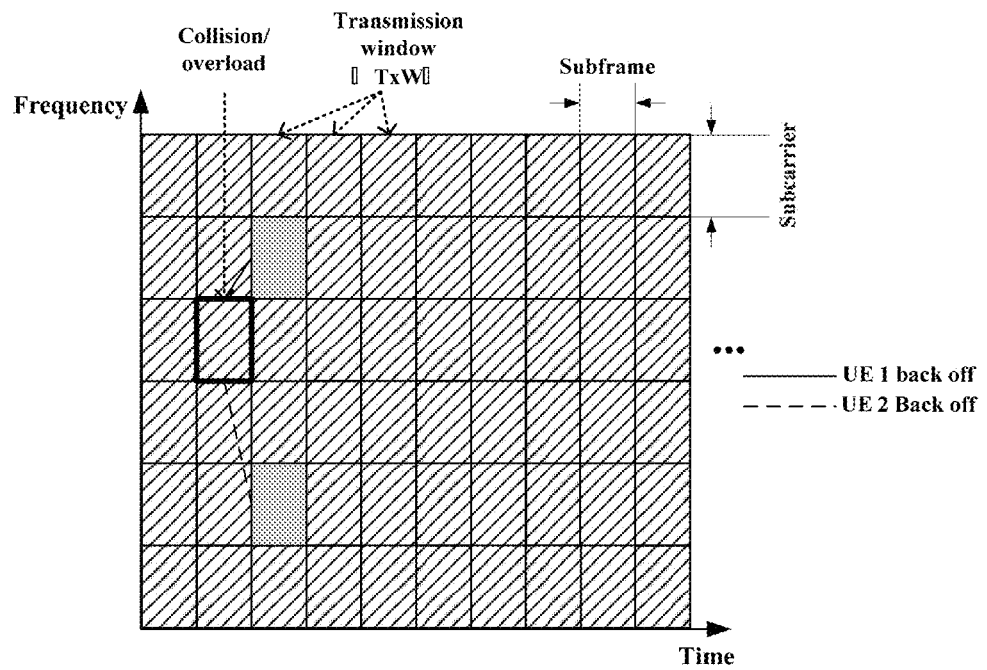
FIG. 6 is a diagram showing an example of a case that a back-off window is cancelled.
Figure 7:
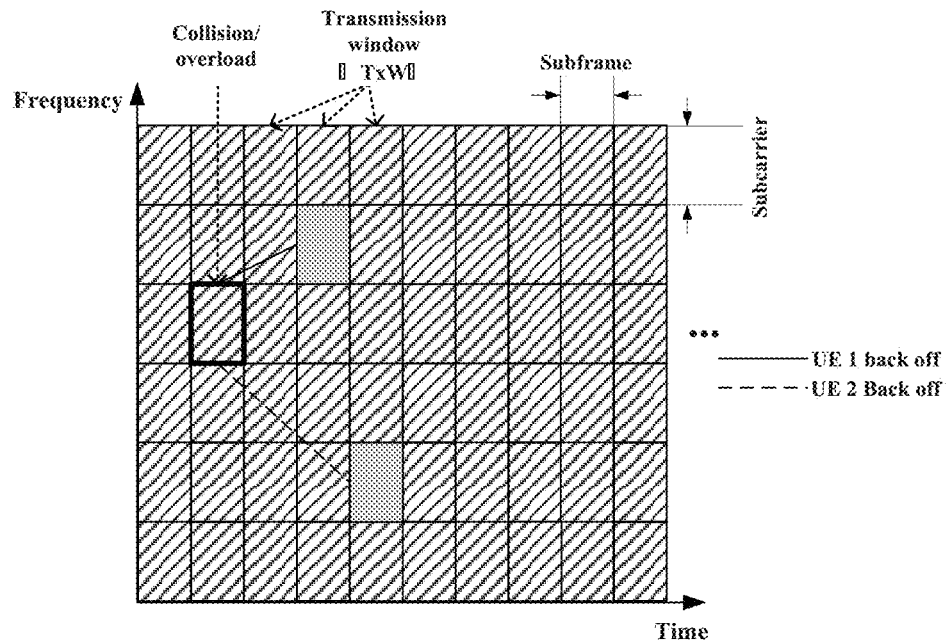
FIG. 7 is a diagram showing an example of a case that a back-off window is cancelled.

In an example, in a case that the number of network nodes that are to perform re-transmission in the back-off window is quite small, for example, less than the maximum number of network nodes that a single RU can support, the determination unit 101 may set the size of the back-off window to be 0, i.e., cancel the back-off window. FIG. 6 is a schematic diagram showing a re-transmission scheme using frequency reselection in this case, and FIG. 7 is a schematic diagram showing a re-transmission scheme using time-frequency reselection in this case. In FIGS. 6 and 7, all time slots are used as transmission windows. In FIG. 6, the UE whose transmission fails reselects an RU in a next time slot to perform re-transmission. In FIG. 7, the UE whose transmission fails may select an RU in one of subsequent time slots to perform re-transmission.

Figure 8:
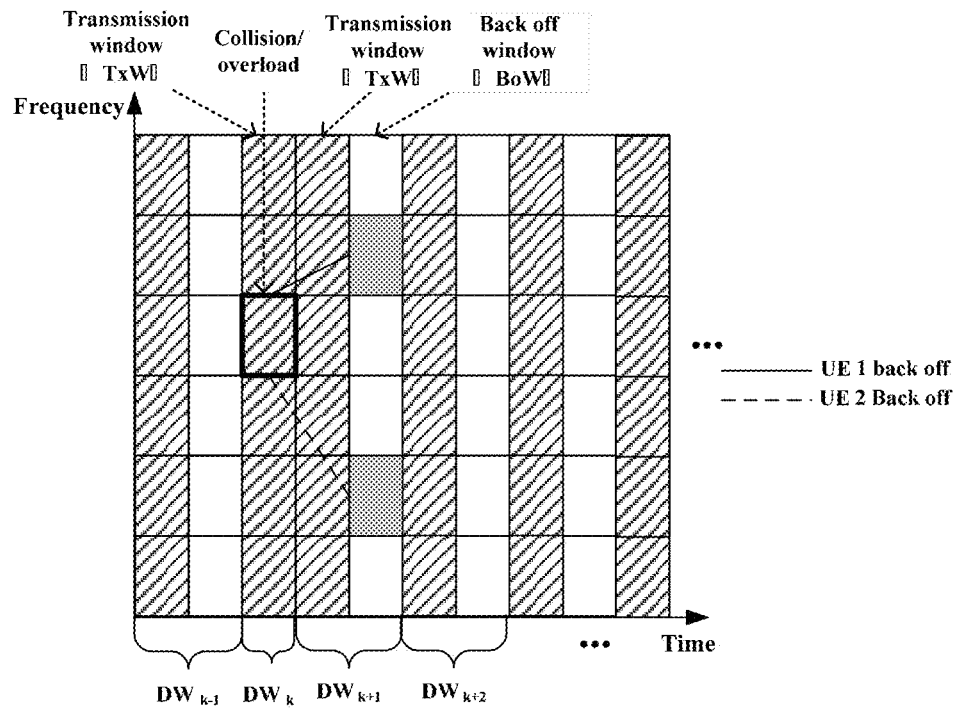
FIG. 8 is a diagram showing an example of a case that a back-off window is cancelled.

In FIGS. 6 and 7, the back-off window is cancelled, for example, until the network node receives new configuration information of setting the back-off window. It may also be set that the operation of the determination unit 101 setting the size of the back-off window to be 0 only validates for the current double window. In this case, the double windows after the current double window move forward one or more time slots accordingly. FIG. 8 shows a schematic diagram of a double window in a case that the current back-off window is cancelled, where the size of the initial back-off window BoW is set as 1. It can be seen that the BoW of the double window $DW_k$ is cancelled. Subsequent double windows move forward one time slot in sequence. UE1 and a UE2 whose transmission in the TxW of the $DW_k$ fails back off to the BoW of the $DW_{k+1}$ for re-transmission. It should be understood that the UE1 and the UE2 may also back off to the TxW of $DW_{k+1}$, or the BoW of a double window after the $DW_{k+1}$, for re-transmission, which is not limiting. FIG. 8 shows only an example.

The case that the predetermined domain is the time domain is described above in detail. According to the parity between the time domain and the frequency domain, the technical solution provided in the present disclosure is also applicable to the case that the predetermined domain is the frequency domain. Specifically, the determination unit 101 may divide transmission resources into a portion for initial data transmission of a network node and a portion for data re-transmission of the network node in the frequency domain. For example, the determination unit 101 may divide the transmission resources into multiple double windows in the frequency domain. Network nodes of different transmission windows may operate in parallel, and randomly select different times for data transmission. When a collision or overload occurs, the network nodes back off to the back-off window for data re-transmission. The back-off window described herein may include a back-off window of a current double window, and may further include back-off windows of other double windows.

Furthermore, in the case that the predetermined domain is a code domain, the above solution is also applicable, and in this case the double window is a double window in the code domain.

With the electronic apparatus 100 according to this embodiment, the transmission resources are divided into a portion for initial data transmission and a portion for data re-transmission in a predetermined domain, so that the number of network nodes whose transmission is successful can be increased, thereby supporting bursting access of a large number of users.

Second Embodiment

Figure 9:
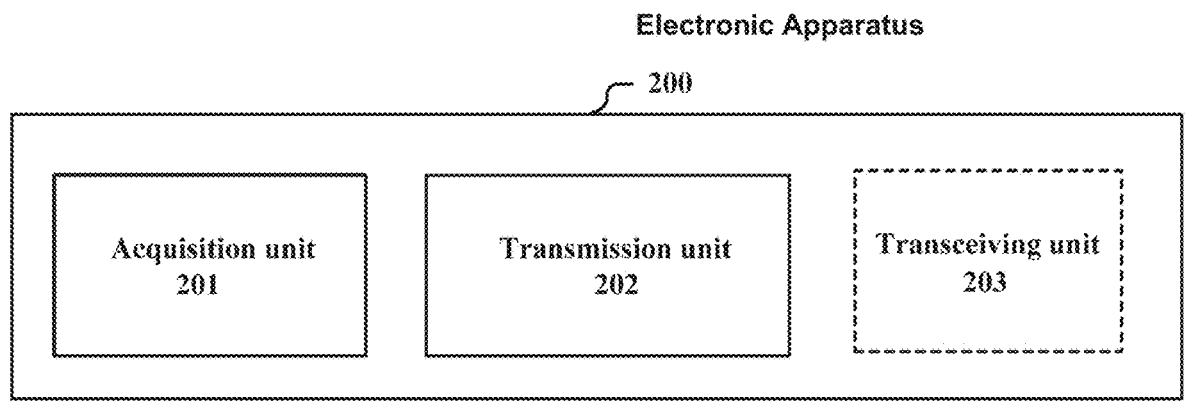
FIG. 9 is a block diagram showing functional modules of an electronic apparatus for a network node in wireless communications according to an embodiment of the present disclosure.

FIG. 9 is a block diagram showing functional modules of an electronic apparatus 200 for a network node in wireless communications according to an embodiment of the present disclosure. As shown in FIG. 9, the electronic apparatus 200 includes: an acquisition unit 201 and a transmission unit 202. The acquisition unit 201 is configured to acquire configuration information containing information on a division manner of transmission resources for the wireless communications in a predetermined domain. Divided transmission resources are used for initial data transmission of the network node and data re-transmission of the network node, respectively. The transmission unit 202 is configured to perform the initial data transmission or the data re-transmission based on the configuration information.

The acquisition unit 201 and the transmission unit 202 may be implemented by one or more processing circuitries, which may be implemented, for example, as a chip.

The acquisition unit 201 may acquire the configuration information from, for example, a network control terminal. Correspondingly, as shown by a dashed line block in FIG. 9, the electronic apparatus 200 may further include a transceiving unit 203, configured to receive the configuration information via one of the following: system information broadcast on downlink share channel DL-SCH, and broadcast channel BCH. The transceiving unit 203 may be implemented, for example, as a transceiver or an antenna, and associated components thereof.

Similar to the first embodiment, the transmission resources for the initial data transmission of the network node and the transmission resources for the data re-transmission of the network node may be distributed in the predetermined domain alternately. For example, the predetermined domain may include one of a time domain, a frequency domain, and a code domain.

In an example, the predetermined domain is the time domain, and time-frequency resources are divided into multiple double windows in the time domain. Each double window includes a transmission window for the initial data transmission of the network node and a back-off window for the data re-transmission of the network node. The transmission unit 202 randomly selects a minimum time-frequency resource unit in the transmission window to perform the initial data transmission, or randomly selects a minimum time-frequency resource unit in the back-off window to perform the data re-transmission.

For example, the network node randomly selects an RU in the transmission window, includes data to be transmitted in a data packet, and transmits the data packet to a network control terminal on the RU. As described in the first embodiment, in a case that the network control terminal demodulates the data transmitted by using the RU successfully, the network control terminal transmits acknowledgment information such as ACK to network nodes in a group of network nodes corresponding to the RU to indicate that the data transmission is successful. Otherwise, the network control terminal transmits NACK to indicate that the data transmission fails.

Therefore, the transmission unit 202 may further be configured to: in the case that the initial data transmission in the transmission window of the current double window fails, perform the data re-transmission in the back-off window of the current double window. In an example, the acquisition unit 201 is further configured to acquire an indication of adjusting the back-off window from the network control terminal, for example, increasing or decreasing a size of the back-off window. The indication may be transmitted by the network control terminal by means of broadcast, for example, via system information broadcast on DL-SCH or BCH broadcast. In this case, if the initial data transmission of the network node in the transmission window of the current double window fails, the transmission unit 202 performs the data re-transmission in the adjusted back-off window. Particularly, the network control terminal may cancel the back-off window. In this case, if the cancellation is only for the current double window, the transmission unit 202 may perform re-transmission in the transmission window or the back-off window of the next double window. On the other hand, if the cancellation lasts until new configuration information is received, the transmission unit may randomly select a subsequent transmission window for data re-transmission.

In addition, the transmission unit 202 may be further configured to: in the case that the data re-transmission in the back-off window fails, back off to perform the data re-transmission in a back-off window after a period of time elapses. For example, the transmission unit 202 may be configured to back off to a next back-off window for data re-transmission. Alternatively, the transmission unit 202 may be configured to back off to a certain back-off window for data re-transmission.

For example, the transmission unit 202 may be configured to determine the back-off window to back off to based on information on a maximum back-off window size from the network control terminal. For example, the transceiving unit 203 may receive the information on the maximum back-off window size while receiving the NACK. The maximum back-off window size may be determined by the network control terminal according to the number of network nodes that are to perform data re-transmission or requirements of the network nodes. For example, in a case that the number of network nodes that are to perform re-transmission is large, the maximum back-off window size is large. In a case that a network node has requirements for transmitting data as soon as possible, the maximum back-off window size is increased. In addition, the maximum back-off window size may also be a fixed value determined according to an average of the number of network nodes that are to perform data re-transmission. In this case, the network control terminal only needs to notify the network node at the initial time.

For example, the transmission unit 202 may randomly select the number of back-off windows to back off within a range of the maximum back-off window size. In a case that the maximum back-off window size is $CW_{max}$, the transmission unit 202 may randomly select a value $CW_B$ within [1, 2 . . . . , $CW_{max}$] at equal probability. For example, if $CW_B=1$ is selected, the re-transmission is performed in the next back-off window. More generally, if the current back-off window is expressed as $BoW_n$, the network node that is to back off for $CW_B$ back-off windows backs off to the back-off window $BoW_{n+CW_B}$ to perform the data re-transmission. In this way, multiple network nodes whose re-transmission fails may be equally distributed to $CW_{max}$ back-off windows, effectively avoiding data accumulation and improving the probability of successful re-transmission. In addition, the setting of the maximum back-off window size can also prevent the network node from waiting for too long time.

Alternatively, the transmission unit 202 may select the number of back-off windows to back off according to a priority level of the network node. For example, the transmission unit 202 may select a smaller number of back-off windows to back off for the network node having a higher priority level. In other words, the network node having a higher priority level may preferentially perform data re-transmission.

Figure 10:
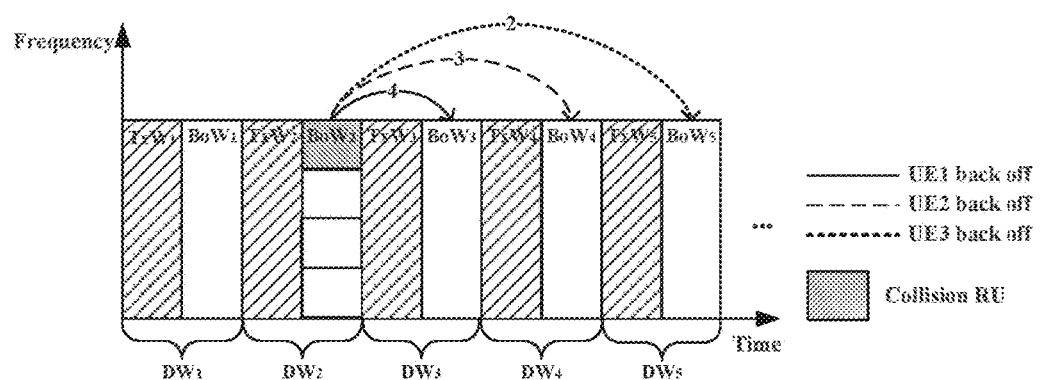
FIG. 10 is a schematic diagram showing an example of selecting a back-off window according to a priority level of a network node.

In an example, the priority level of the network node may increase as the number of re-transmissions increases. For example, an initial priority level which is indicated by a parameter user priority, of the network node is set to be 0. Each time the re-transmission is performed, i.e., each time NACK is received, the priority level user priority is incremented by 1. The number of back-off windows to back off by the user is set to be $CW_B=CW_{max}$–user priority. If the user priority is greater than or equal to $CW_{max}$, the $CW_B$ may be set to be 1. FIG. 10 is a schematic diagram showing an example of selecting a back-off window according to a priority level of a network node. The re-transmission of the UE1 to the UE3 in the back-off window $BoW_2$ fails, and the UE1 to the UE3 need to back off to perform the re-transmission again. The maximum back-off window size $CW_{max}=5$, and the number marked on a curve with an arrow indicates the priority level of the corresponding UE. For example, for the UE1, the priority level of the UE1 is 4, and in this case, $CW_B=1$. Therefore, the UE1 should back off to $BoW_3$ to perform data re-transmission.

It can be seen that, with the setting, the network node performing the re-transmission for more times would back off for fewer back-off windows, thereby ensuring fairness in the transmission process.

In addition, in a case that the network node performs re-transmission in the selected back-off window, frequency reselection may also be performed at the same time. For example, the network node may randomly select a certain RU in the back-off window for data re-transmission at equal probability. The network node may also select the RU with the same frequency as that used in the previous transmission window for data re-transmission, or select the RU by using other methods, which is not limiting.

The transmission unit 202 may be further configured to contain requirement information of the network node in a data packet transmitted from the network node to a network control terminal, so that the network control terminal adjusts the division manner according to the requirement information. For example, in a case that the requirement information indicates a requirement for transmitting data as soon as possible, the network control terminal may increase the size of the back-off window to meet the requirement.

Furthermore, although the above detailed description is given by taking the time domain as an example of the predetermined domain, the technical solution in the description may be similarly applicable to the frequency domain or the code domain. That is, a double window is set in the frequency domain or the code domain, so that the network node performs initial data transmission in the transmission window, and performs data re-transmission in the back-off window.

The electronic apparatus 200 according to this embodiment performs initial data transmission in the transmission window and performs data re-transmission in the back-off window determined according to the configuration information, respectively, which can effectively avoid data accumulation and improve the probability of successful data transmission.

Figure 11:
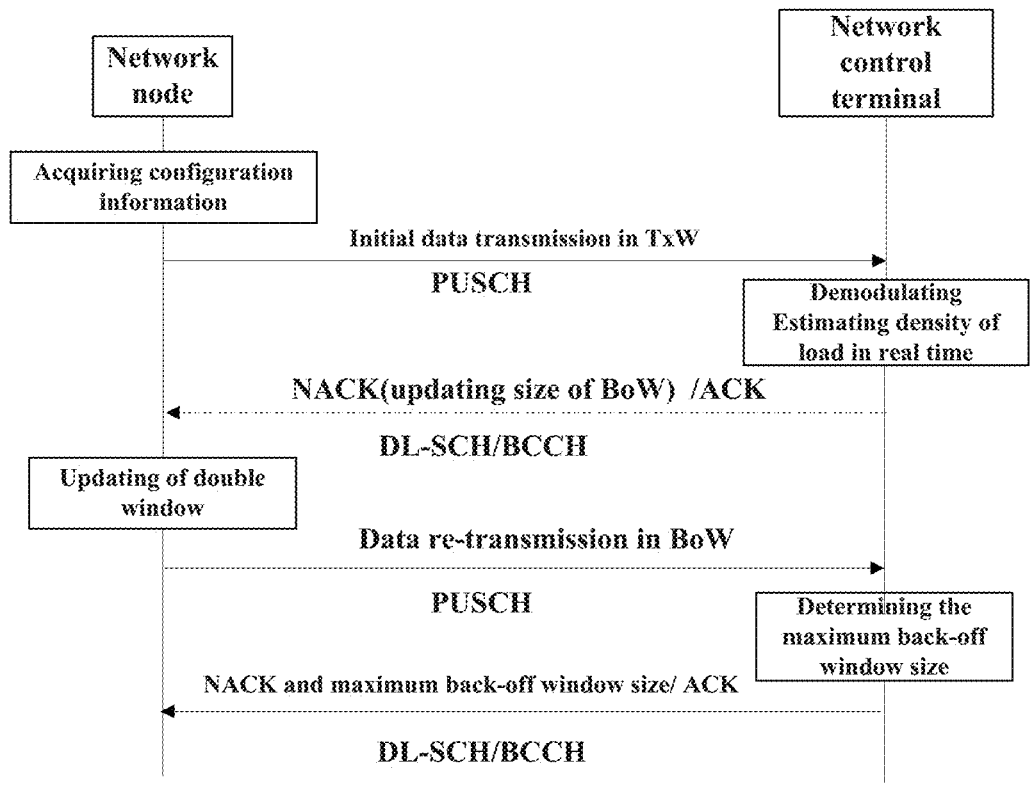
FIG. 11 is a diagram showing an information procedure between a network control terminal and a network node.

For ease of understanding, FIG. 11 shows an information procedure between a network control terminal and a network node.

Firstly, the network node acquires initial configuration information such as sizes of the transmission window and the back-off window from the network control terminal. Then, the network node transmits new data to the network control terminal in the transmission window, for example, via a Physical Uplink Share Channel (PUSCH). The network control terminal demodulates the received data, and estimates density of the load in a real time manner during the process, such as the number of network nodes whose data is not successfully received. For a group of network nodes whose data is successfully received, the network control terminal transmits ACK to the network nodes in the group of network nodes. For a group of network nodes whose data is not successfully received, the network control terminal transmits NACK to the network nodes in the group of network nodes. In addition, the network control terminal may adjust the size of the back-off window according to the estimated number of network nodes that are to perform data re-transmission, and the adjustment instruction is transmitted to the network node by means of broadcast. As can be seen from FIG. 11, the transmission of both ACK and NACK may be performed via DL-SCH or BCH.

A network node whose transmission is unsuccessful updates the double window after receiving the instruction to adjust the BoW, and performs re-transmission in the updated BoW via the PUSCH. The network control terminal then determines, for a group of network nodes whose re-transmission in the BoW is unsuccessful, the maximum back-off window size $CW_{max}$ according to the number of network nodes therein, and transmits the $CW_{max}$ together with the NACK to the network nodes in the group of network nodes. The network control terminal transmits the ACK to the network nodes in the group of network nodes whose re-transmission in the BoW is successful.

After receiving the ACK, the network node enters a sleep state if there is no new data to be transmitted, and repeats the above procedure if there is new data to be transmitted.

In order to further explain the technical effects that can be achieved by the technical solution of the present disclosure, simulation results as examples are given below. As mentioned above, the introduction of back-off windows helps to increase the number of users whose transmission is successful, i.e., the number of users that can be successfully demodulated after several double windows, which is hereinafter referred to as throughput. The performance of the scheme with no back-off window (hereinafter referred to as single window SW) shown in FIGS. 6 and 7 is compared with the performance of the scheme with the double window DW shown in FIGS. 2 and 4.

Specifically, simulations are performed for the following five schemes: a) an SW scheme using frequency reselection (see FIG. 6); b) an SW scheme using time-frequency reselection (seen FIG. 7); c) a DW scheme using frequency reselection (seen FIG. 2); d) a DW scheme using time-frequency reselection (seen FIG. 4), where the number of back-off windows to back off is randomly selected; and e) a DW scheme using time-frequency reselection (seen FIG. 4), where the number of back-off windows to back off is selected according to the priority level of the user.

In the DW scheme, the size of the BoW is fixed, and the sizes of the BoW and the TxW are both one time slot. The number of new users entering a certain TxW is indicated by K which follows a Poisson distribution, that is, K~P($\lambda$). It is assumed that an average of the number of new users entering the TxW is indicated by $\lambda$, the probability of observing K new users entering the TxW is $$P(K \text{ new users entering } TxW_n) = \frac{\lambda^K e^{-\lambda}}{K!} \quad (1)$$

Figure 12:
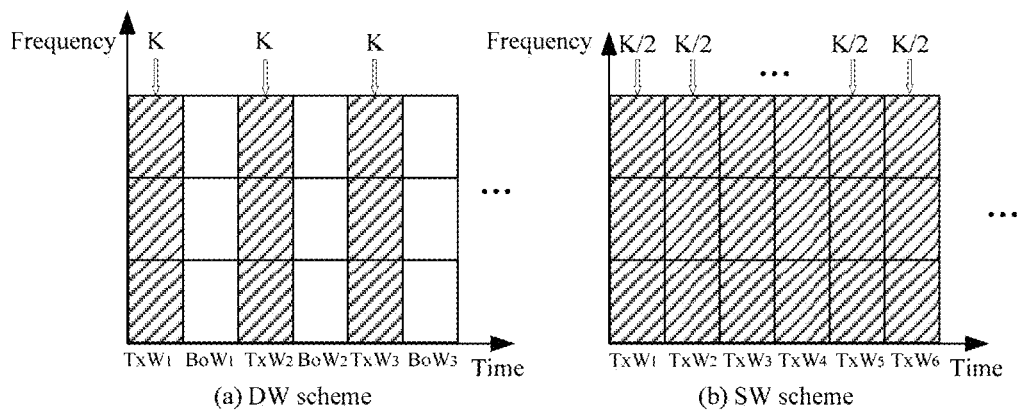
FIG. 12 shows a manner in which new users enter a window respectively in a single window scheme and in a double window scheme.

FIG. 12 shows a manner in which new users enter a window respectively in an SW scheme and a DW scheme. In the DW scheme, K users all perform transmission in the TxW, and users entering the BoW are retransmission users. For the SW scheme, only $$\frac{K}{2}$$

users enter each TxW. The number of new users entering in the two schemes is equal to each other every two time slots.

The simulation parameters are set as follows: the number of RUs that can be used by the user in a grant-free manner in each time slot is 16, the maximum number of users that can be processed simultaneously by each RU is 3, the average number $\lambda$ of new users entering the TxW in each DW are 24, 48, and 72, respectively, and the maximum back-off window size is limited to be 5.

Figure 13:
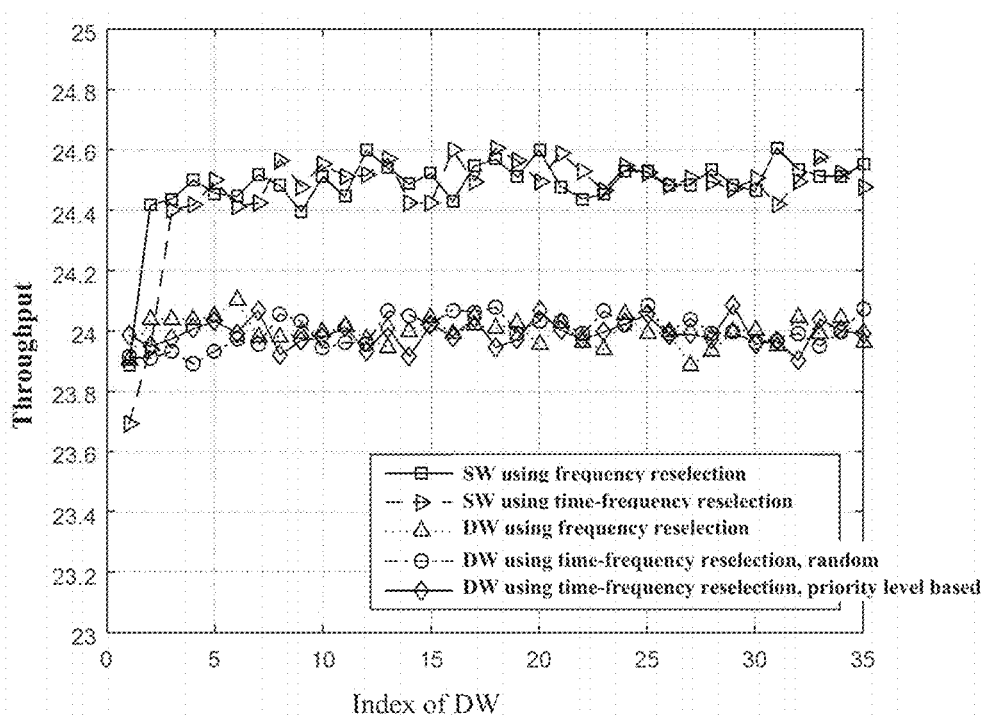
FIGS. 13 to 20 show graphs of simulation results.
Figure 14:
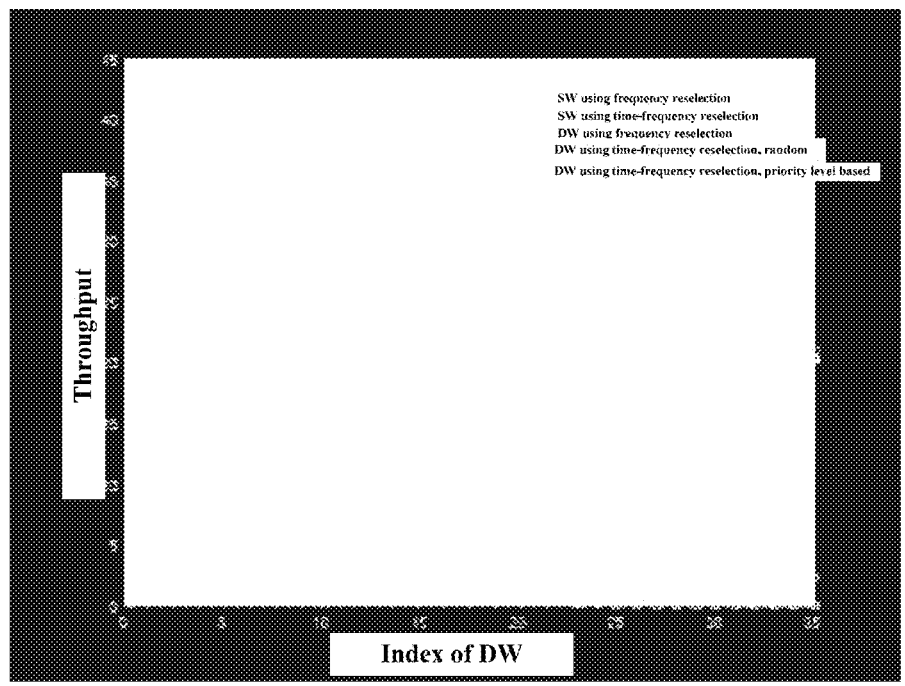
Figure 15:
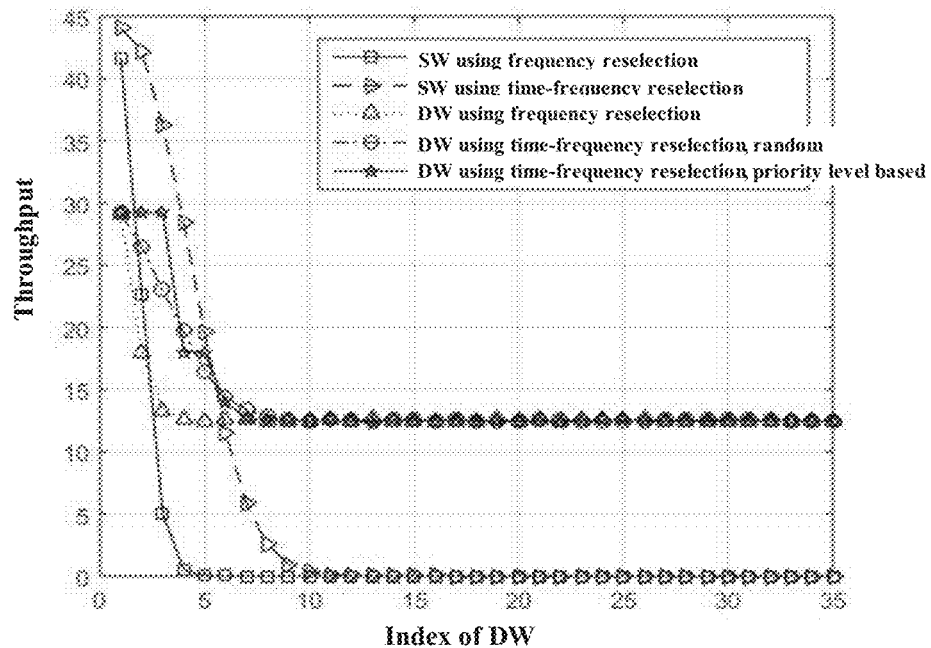

FIGS. 13 to 15 respectively show graphs of throughput versus a time window respectively for five schemes under different numbers $\lambda$ of new users, where the horizontal axis is the index of DW, and the vertical axis is the throughput. It can be seen that the performances of the SW and DW schemes are not much different from each other in the case that the average number of users entering each TxW is small (for example, which may be 24). Since the number of users is much smaller than the total number of users that the RUs in one time slot can support, the probability of the data re-transmission is small. In the above five schemes, data of most users can be successfully transmitted and be demodulated by the base station.

In the case that the average number of users entering each TxW is large (for example, which may be 48 or 72), that is, close to or exceeds the total number of users that the RUs in one time slot can support, the probability that data can be correctly decoded is lower, so that most subframes will be retransmitted at a high probability. Therefore, the DW scheme in which the back-off window BoW for re-transmission is set still operates, and the number of users successfully demodulated is close to 50%, but the SW scheme cannot operate in the later stage due to the accumulation of users needing to perform data re-transmission.

Further, for a given resource block, under the same number of RUs and the same number L of users that each RU can support, the average number failnum of users whose data cannot be successfully demodulated in a single window and in a double window under the SW and DW schemes are compared with each other. The number of RUs is defined as RUnum, and the maximum number of users that can be processed simultaneously by each RU is L. The number k of users is selected on the premise of being not greater than the maximum number of users that can be transmitted in the grant-based manner. That is, $$k_{max} \leq RUnum \times L \quad (2)$$

Figure 16:
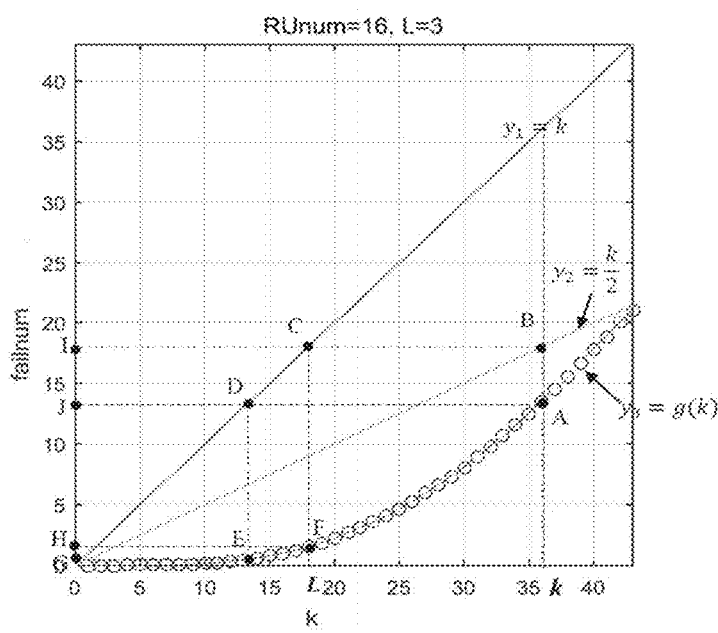

A graph formed by connecting circles in FIG. 16 is a curve of the number of users whose data is not successfully demodulated versus the number of users entering the window obtained by simulation, which is expressed as $y_3 = g(k)$. It can be seen that the curve is a monotonic function and is lower than a curve $$y_2 = \frac{k}{2}.$$

According to the above two properties of the function, it can be obtained that $\|g(k)\|g(k)$ monotonically increases in the case of $$\frac{k}{2} > g(k).$$

Therefore, the following expression can be obtained.

$$g\left(\frac{k}{2}\right) > g(g(k)) \quad (3)$$

where g(g (k)) indicates the number of users whose data is not successfully demodulated under the DW scheme, and $$g\left(\frac{k}{2}\right)$$

indicates the number of users whose data is not successfully demodulated in the first time slot under the SW scheme. Regardless of whether these users perform re-transmission in the second time slot of the SW, the number of failed users whose data is not successfully demodulated must be greater than $$g\left(\frac{k}{2}\right).$$

That is, $$g\left(\frac{k}{2}+\alpha\right) > g\left(\frac{k}{2}\right), \alpha \geq 0 \quad (4)$$

Therefore, the following expression can be obtained.

$$g\left(\frac{k}{2}+\alpha\right) > g(g(k)) \quad (5)$$

According to the geometric relationship in FIG. 16, in the case that the number of users is selected as $$k, g\left(\frac{k}{2}\right)$$

is H shown in FIG. 16, and g (g(k)) is G shown in FIG. 16. Regardless of whether the H users whose data is not successfully demodulated under the SW scheme perform re-transmission in the next time slot of the SW, the number of users whose data is not successfully demodulated under the SW scheme must be greater than G.

Figure 17:
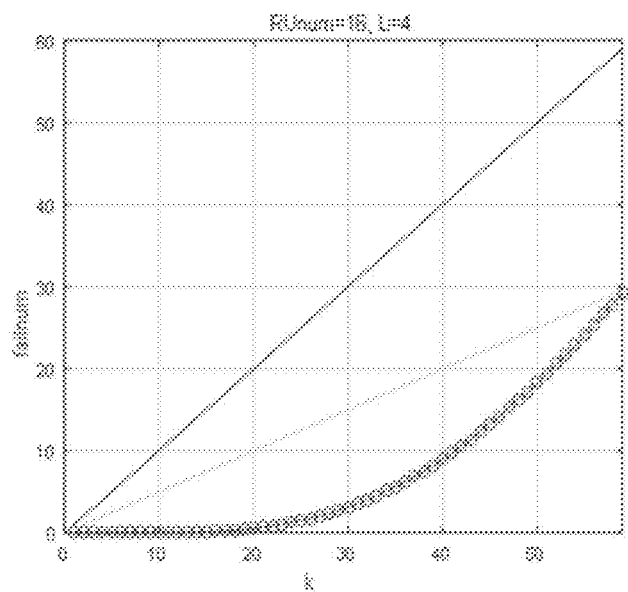
Figure 18:
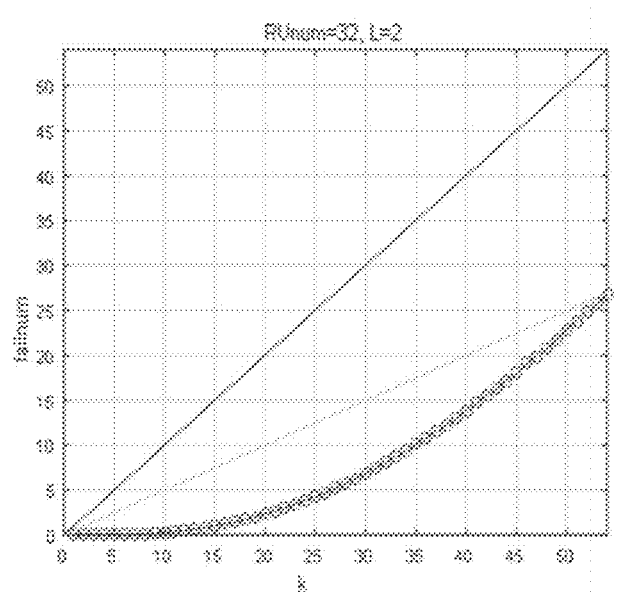

When the parameters RUnum and L are changed, FIGS. 17 and 18 present the same geometric relationship and properties as FIG. 16. Therefore, it can be proved that the number of users whose data is not successfully demodulated under the DW scheme is less than that under the SW scheme.

Figure 19:
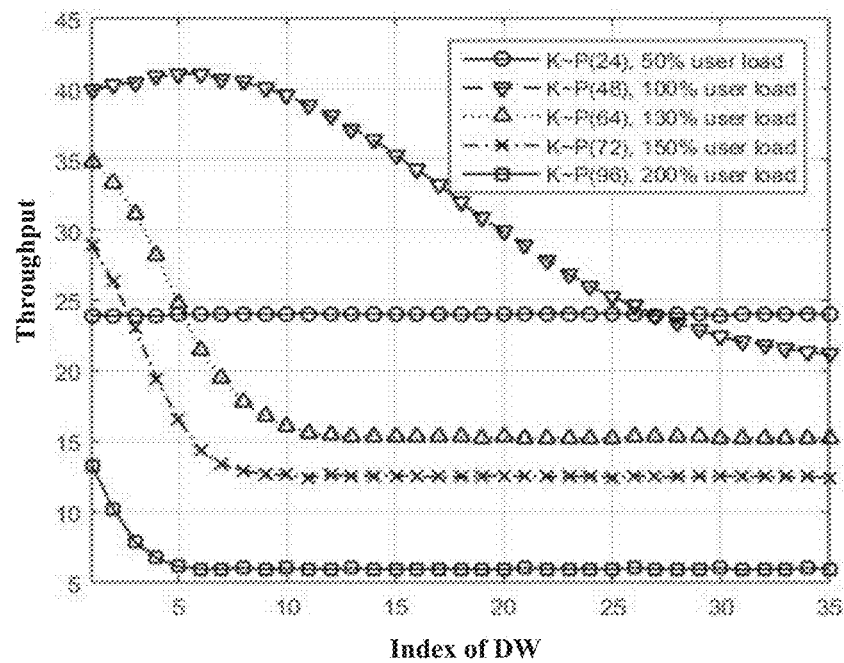

In addition, the throughput under the DW scheme (in which the number of back-off windows to back off is randomly selected) is simulated under different user loads, where the user load indicates a ratio of the number of users to the amount of resources, which is expressed herein in percentage. The simulation result is shown in FIG. 19, in which the number of RUs that can be used by the user in a grant-free manner in each time slot is 16, and the maximum number of users that can be simultaneously processed by each RU is 3. It can be seen that under the DW scheme, data transmission of a small number of users can still be successful when the number of users is overloaded by 150%.

Figure 20:
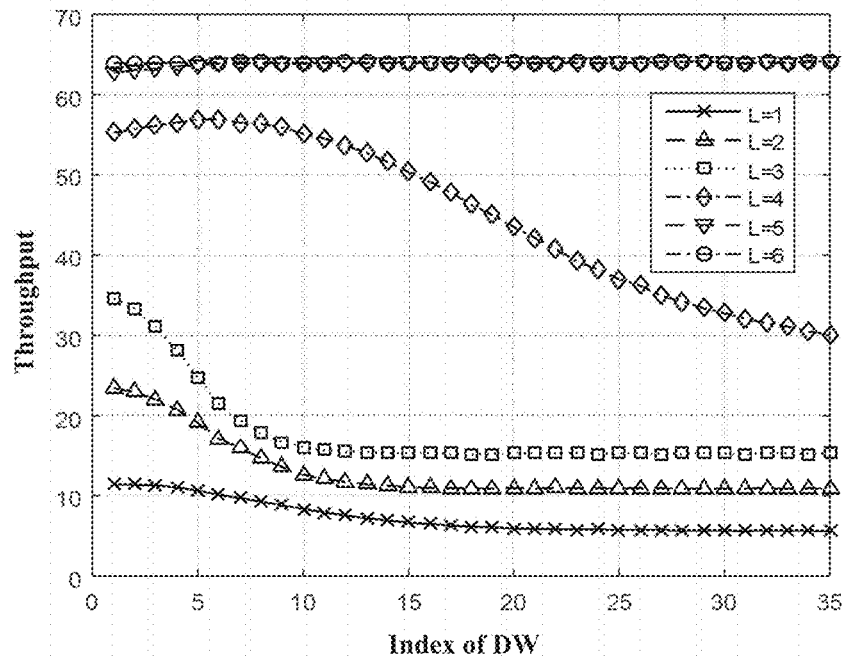

FIG. 20 further shows simulation results of the throughput of the DW scheme under different RU carrying capacities, i.e., different maximum number of users that the RU can support, in which the number of RUs that can be used by the user in a grant-free manner in each time slot is 16, and the maximum number of users that each RU can support is represented by a variable L. The number of new users entering a TxW meets K~P(64). It can be seen that the larger the carrying capacity of the RU is, the smaller the probability of collision is, and the larger the number of users whose data can be successfully demodulated by the base station is. by the base station is.

It should be understood that the parameters and settings employed in the above simulations and the simulation results are only for illustrative purposes and are not intended to limit the present disclosure.

Third Embodiment

In the process of describing the electronic apparatus for a network control terminal in wireless communications and the electronic apparatus for a network node in wireless communications in the embodiments described above, obviously, some processing and methods are also disclosed. Hereinafter, an overview of the methods is given without repeating some details disclosed above. However, it should be noted that, although the methods are disclosed in a process of describing the electronic apparatus for a network control terminal in wireless communications and the electronic apparatus for a network node in wireless communications, the methods do not certainly employ or are not certainly executed by the aforementioned components. For example, the embodiments of the electronic apparatus for a network control terminal in wireless communications and the electronic apparatus for a network node in wireless communications may be partially or completely implemented with hardware and/or firmware, the method described below may be executed by a computer-executable program completely, although the hardware and/or firmware of the electronic apparatus for a network control terminal in wireless communications and the electronic apparatus for a network node in wireless communications can also be used in the methods.

Figure 21:
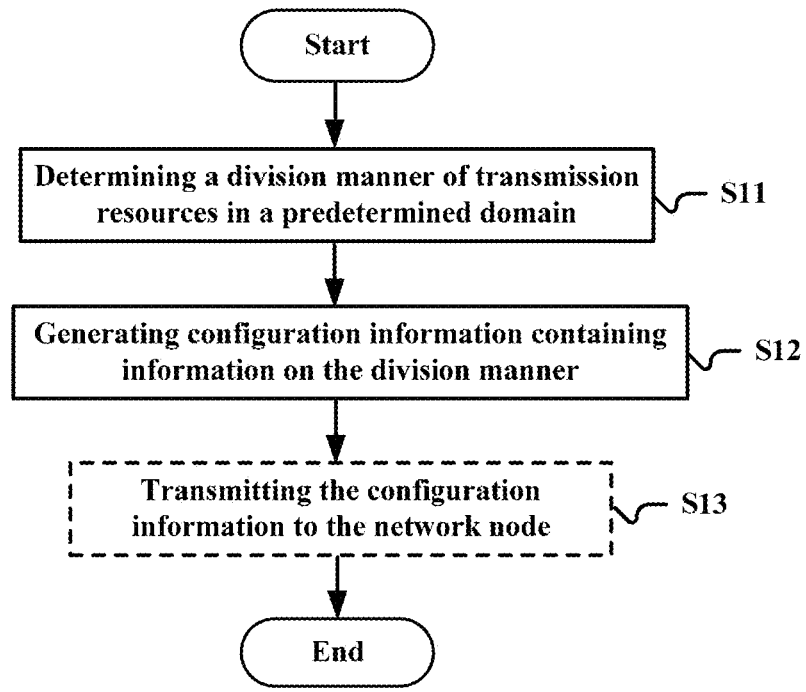
FIG. 21 is a flowchart showing a method for a network control terminal in wireless communications according to an embodiment of the present disclosure.

FIG. 21 shows a method for a network control terminal in wireless communications according to an embodiment of the present disclosure. The method includes the steps of: determining a division manner of transmission resources for the wireless communications in a predetermined domain (S11), where divided transmission resources are used for initial data transmission of a network node and data re-transmission of the network node, respectively; and generating configuration information containing information on the division manner (S12).

The predetermined domain may include one of a time domain, a frequency domain, and a code domain. The transmission resources for the initial data transmission of the network node and the transmission resources for the data re-transmission of the network node may be distributed in the predetermined domain alternately.

As shown by a dashed line block in FIG. 21, the above method may further include step S13: transmitting the configuration information to the network node. For example, the transmission may be performed via one of the following: system information broadcast on downlink share channel DL-SCH, and broadcast channel BCH.

In an example, the predetermined domain is the time domain, and time-frequency resources are divided into multiple double windows in the time domain in step S11. Each double window includes a transmission window for the initial data transmission of the network node and a back-off window for the data re-transmission of the network node. The back-off window is used for data re-transmission by the network node whose transmission fails in the transmission window of the current double window. In addition, the back-off window may further be used for data re-transmission by the following network nodes: at least a part of network nodes whose re-transmission fails in the back-off window of a previous double window.

In addition, in step S11, a size of the back-off window may be adjusted according to at least one of: the number of network nodes that are to perform data re-transmission in the current back-off window, and requirements of the network nodes.

In step S11, configuration of a minimum time-frequency resource unit in the transmission window and the back-off window may be determined. The network node randomly selects the minimum time-frequency resource unit in the transmission window to perform the initial data transmission or randomly selects the minimum time-frequency resource unit in the back-off window to perform the data re-transmission.

In step S12, according to a demodulation result for the data from the network node, indication information specific to a group of network nodes is generated to notify the network nodes in the group of network nodes of whether data transmission is successful. The network nodes utilizing the same minimum time-frequency resource unit to perform the data transmission constitute the group of network nodes. If there is a network node whose data is not demodulated successfully in the group of network nodes, indication information NACK specific to the group of network nodes and indicating that the data transmission is unsuccessful is generated. Otherwise, indication information ACK specific to the group of network nodes and indicating that the data transmission is successful is generated.

As for a group of network nodes whose data transmission in the back-off window is unsuccessful, a maximum back-off window size for the group of network nodes may be generated in step S12. The maximum back-off window size indicates the maximum number of back-off windows for which the network node in the group of network nodes is capable of backing off.

For example, the maximum back-off window size is positively correlated to the number of the network nodes whose data transmission in the back-off window is unsuccessful.

Figure 22:
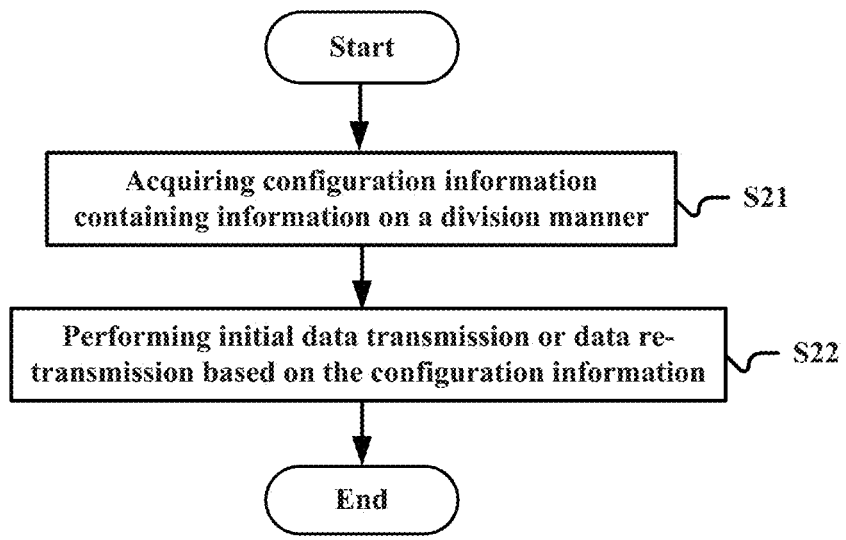
FIG. 22 is a flowchart showing a method for a network node in wireless communications according to an embodiment of the present disclosure.

FIG. 22 shows a method for a network node in wireless communications according to an embodiment of the present disclosure. The method includes the steps of; acquiring configuration information containing information on a division manner of transmission resources for the wireless communications in a predetermined domain (S21), where divided transmission resources are used for initial data transmission of the network node and data re-transmission of the network node, respectively; and performing the initial data transmission or the data re-transmission based on the configuration information (S22).

The predetermined domain may include one of a time domain, a frequency domain, and a code domain. The transmission resources for the initial data transmission of the network node and the transmission resources for the data re-transmission of the network node may be distributed in the predetermined domain alternately.

In step S21, the configuration information may be received via one of the following: system information broadcast on downlink share channel DL-SCH, and broadcast channel BCH.

In an example, the predetermined domain is the time domain, and time-frequency resources are divided into multiple double windows in the time domain. Each double window includes a transmission window for the initial data transmission of the network node and a back-off window for the data re-transmission of the network node. In step S22, a minimum time-frequency resource unit in the transmission window is randomly selected to perform the initial data transmission, or a minimum time-frequency resource unit in the back-off window is randomly selected to perform the data re-transmission.

For example, in the case that the initial data transmission in the transmission window of the current double window fails, the data re-transmission is performed in the back-off window of the current double window. In addition, the back-off is performed in the case that the data re-transmission in the back-off window fails, so that the data re-transmission is performed in a back-off window after a period of time elapses. Exemplarily, it is possible to back off to a next back-off window of the current back-off window to perform the data re-transmission.

In step S22, the back-off window to back off to may be determined based on information on a maximum back-off window size from a network control terminal. For example, the number of back-off windows to back off is randomly selected within a range of the maximum back-off window size, or the number of back-off windows to back off is selected according to a priority level of the network node. The priority level of the network node may be set to be increased with the increase of the number of re-transmissions, and a smaller number of back-off windows to back off is selected for the network node having a higher priority level.

In addition, a data packet transmitted from the network node to the network control terminal may further include user requirement information of the network node, so that the network control terminal adjusts the division manner according to the user requirement information.

With the above methods, the transmission resources are divided into a portion for initial data transmission and a portion for data re-transmission in a predetermined domain, so that the number of network nodes whose transmission is successful can be increased, thereby supporting bursting access of a large number of users.

It should be noted that, the above methods can be performed separately or in combination with each other, and the details thereof are described in the first to the second embodiments, which are not repeatedly described herein.

Application Example

The technology of the present disclosure is applicable to various products. For example, the above mentioned base station may be realized as any type of evolved Node B (eNB) such as a macro eNB and a small eNB. The small eNB such as a pico eNB, micro eNB and a home (femto-cell) eNB may have a smaller coverage range than a macro cell. Alternatively, the base station may also be implemented as any other type of base stations, such as a NodeB and a base transceiver station (BTS). The base station may include a body (also referred to as a base station device) configured to control wireless communications; and one or more remote radio heads (RRHs) arranged in a different position from the body. In addition, various types of user equipments, which will be described below, may each operate as the base station by temporarily or semi-persistently executing a base station function.

Application Example Regarding Base Station

First Application Example

Figure 23:
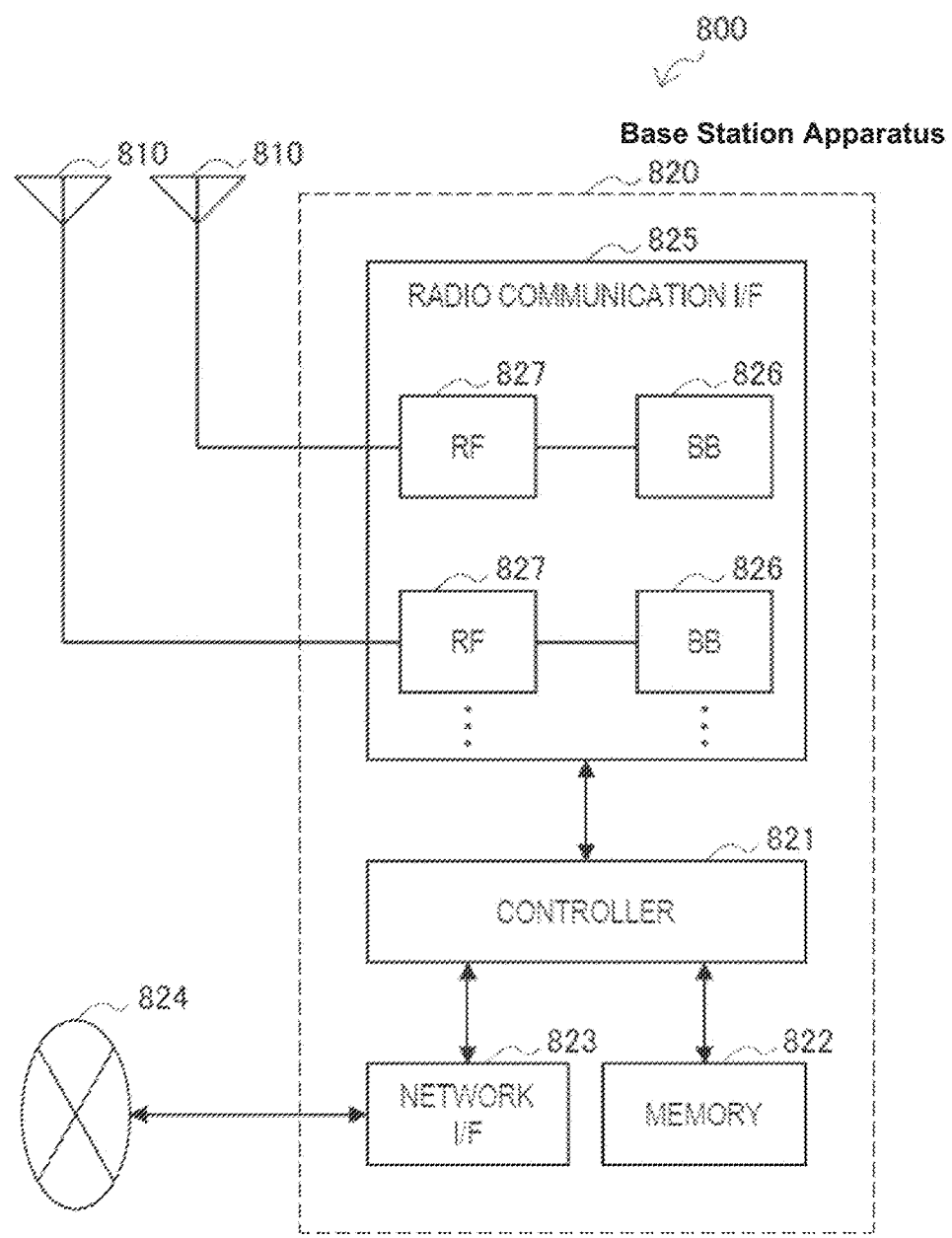
FIG. 23 is a block diagram illustrating a first example of a schematic configuration of an eNB to which the technology of the present disclosure may be applied.

FIG. 23 is a block diagram illustrating a first example of a schematic configuration of an eNB to which the technology of the present disclosure may be applied. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 23, the eNB 800 may include the multiple antennas 810. For example, the multiple antennas 810 may be compatible with multiple frequency bands used by the eNB 800. Although FIG. 23 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an Si interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As show in FIG. 23, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 23. For example, the multiple RF circuits 827 may be compatible with multiple antenna elements. Although FIG. 23 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 23, the transceiving unit 103 described with reference to FIG. 1 may be implemented by the radio communication interface 825. At least a part of the functions may also be implemented by the controller 821. For example, the controller 821 may perform determination of the division manner of the transmission resources in the predetermined domain and generation of the configuration information by performing the functions of the determination unit 101 and the generation unit 102.

Second Application Example

Figure 24:
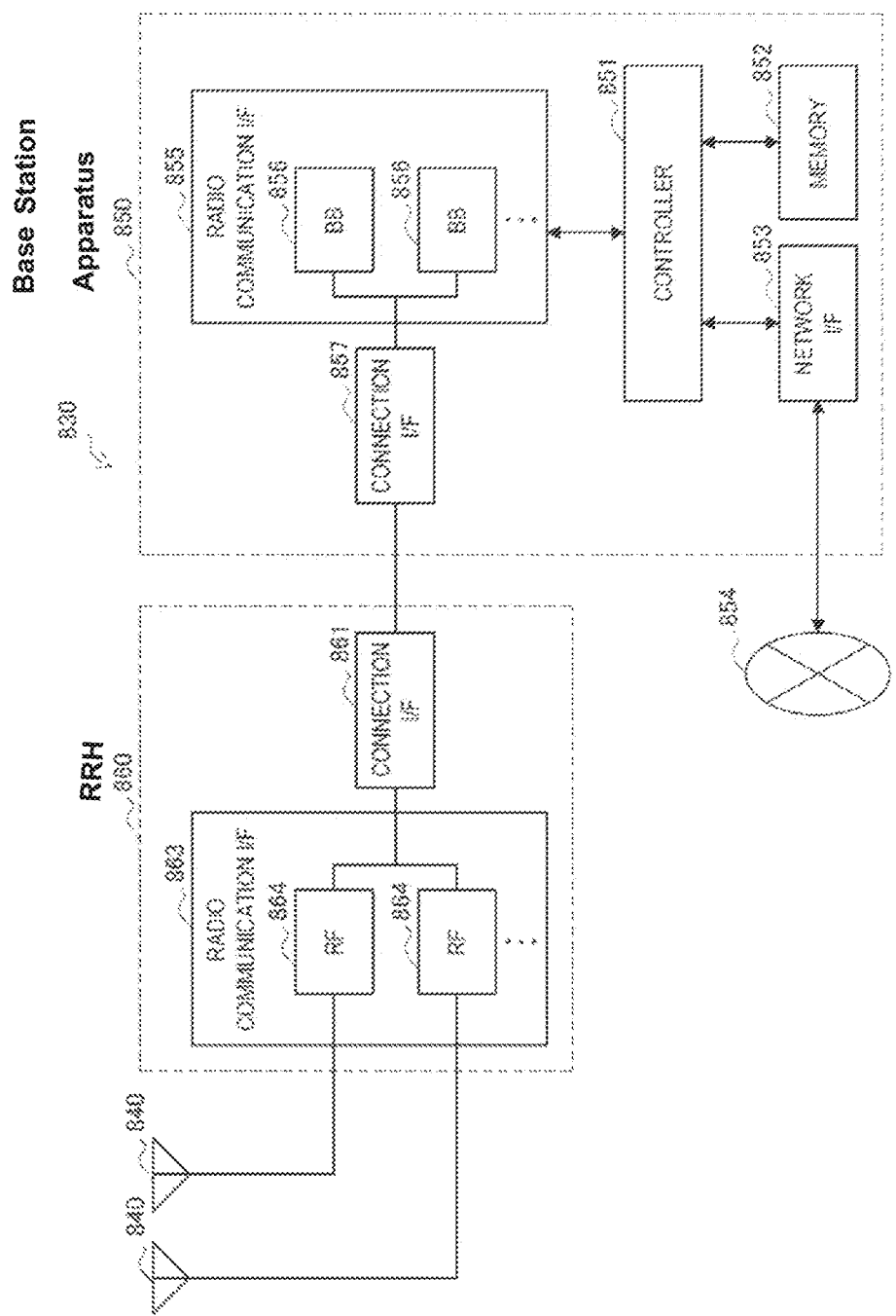
FIG. 24 is a block diagram illustrating a second example of a schematic configuration of an eNB to which the technology of the present disclosure may be applied.

FIG. 24 is a block diagram illustrating a second example of a schematic configuration of an eNB to which the technology of the present disclosure may be applied. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 24, the eNB 830 may include the multiple antennas 840. For example, the multiple antennas 840 may be compatible with multiple frequency bands used by the eNB 830. Although FIG. 24 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 24.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 24, except that the BB processor 856 is connected to an RF circuit 864 of the RRH 860 via the connection interface 857. As show in FIG. 24, the radio communication interface 855 may include the multiple BB processors 856. For example, the multiple BB processors 856 may be compatible with multiple frequency bands used by the eNB 830. Although FIG. 24 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 24. For example, the multiple RF circuits 864 may support multiple antenna elements. Although FIG. 24 shows the example in which the radio communication interface 863 includes the multiple RF circuits 864, the radio communication interface 863 may also include a single RF circuit 864.

In the eNB 830 shown in FIG. 24, the transceiving unit 103 described with reference to FIG. 1 may be implemented by the radio communication interface 855 and/or the radio communication interface 863. At least a part of the functions may also be implemented by the controller 851. For example, the controller 851 may perform determination of the division manner of the transmission resources in the predetermined domain and generation of the configuration information by performing the functions of the determination unit 101 and the generation unit 102.

Application Example Regarding User Equipment

First Application Example

Figure 25:
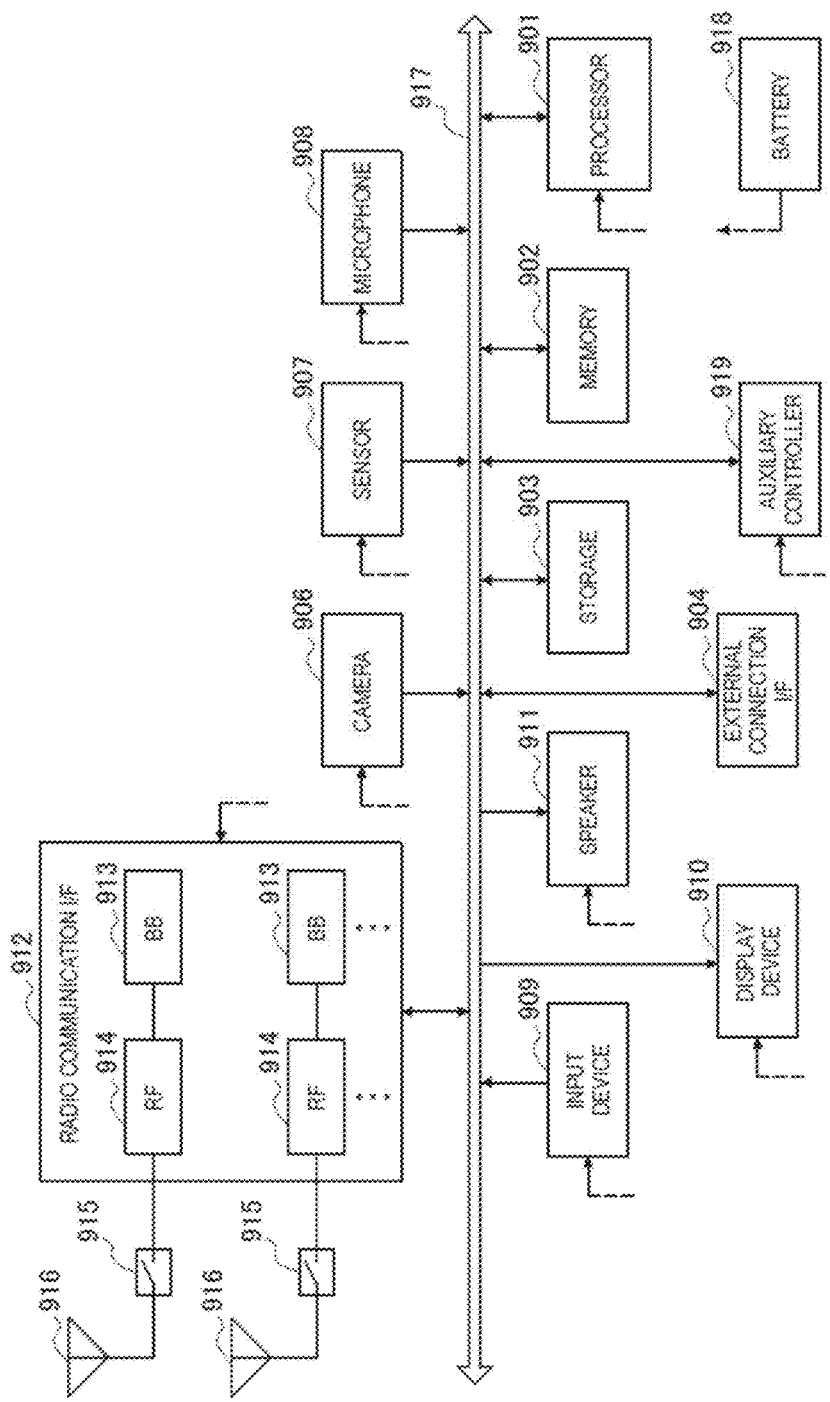
FIG. 25 is a block diagram illustrating an example of a schematic configuration of a smart phone to which the technology of the present disclosure may be applied.

FIG. 25 is a block diagram illustrating an example of a schematic configuration of a smartphone 900 to which the technology of the present disclosure may be applied. The smart phone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smart phone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smart phone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smart phone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smart phone 900. The speaker 911 converts audio signals that are outputted from the smart phone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. The radio communication interface 912 may be a chip module having the BB processor 913 and the RF circuit 914 integrated thereon. The radio communication interface 912 may include multiple BB processors 913 and multiple RF circuits 914, as shown in FIG. 25. Although FIG. 25 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smart phone 900 may include the multiple antennas 916, as shown in FIG. 25. Although FIG. 25 shows the example in which the smart phone 900 includes the multiple antennas 916, the smart phone 900 may also include a single antenna 916.

Furthermore, the smart phone 900 may include the antenna 916 for each wireless communication scheme. In this case, the antenna switches 915 may be omitted from the configuration of the smart phone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 25 via feeder lines that are partially shown as dashed lines in FIG. 25. The auxiliary controller 919, operates a minimum necessary function of the smart phone 900, for example, in a sleep mode.

In the smart phone 900 shown in FIG. 25, the transceiving unit 203 described with reference to FIG. 9 may be implemented by the radio communication interface 912. At least a part of the functions may also be implemented by the processor 901 or the auxiliary controller 919. For example, the processor 901 or the auxiliary controller 919 may perform acquisition of the configuration information and data transmission by performing the functions of the acquisition unit 201 and the generation unit 202.

Second Application Example

Figure 26:
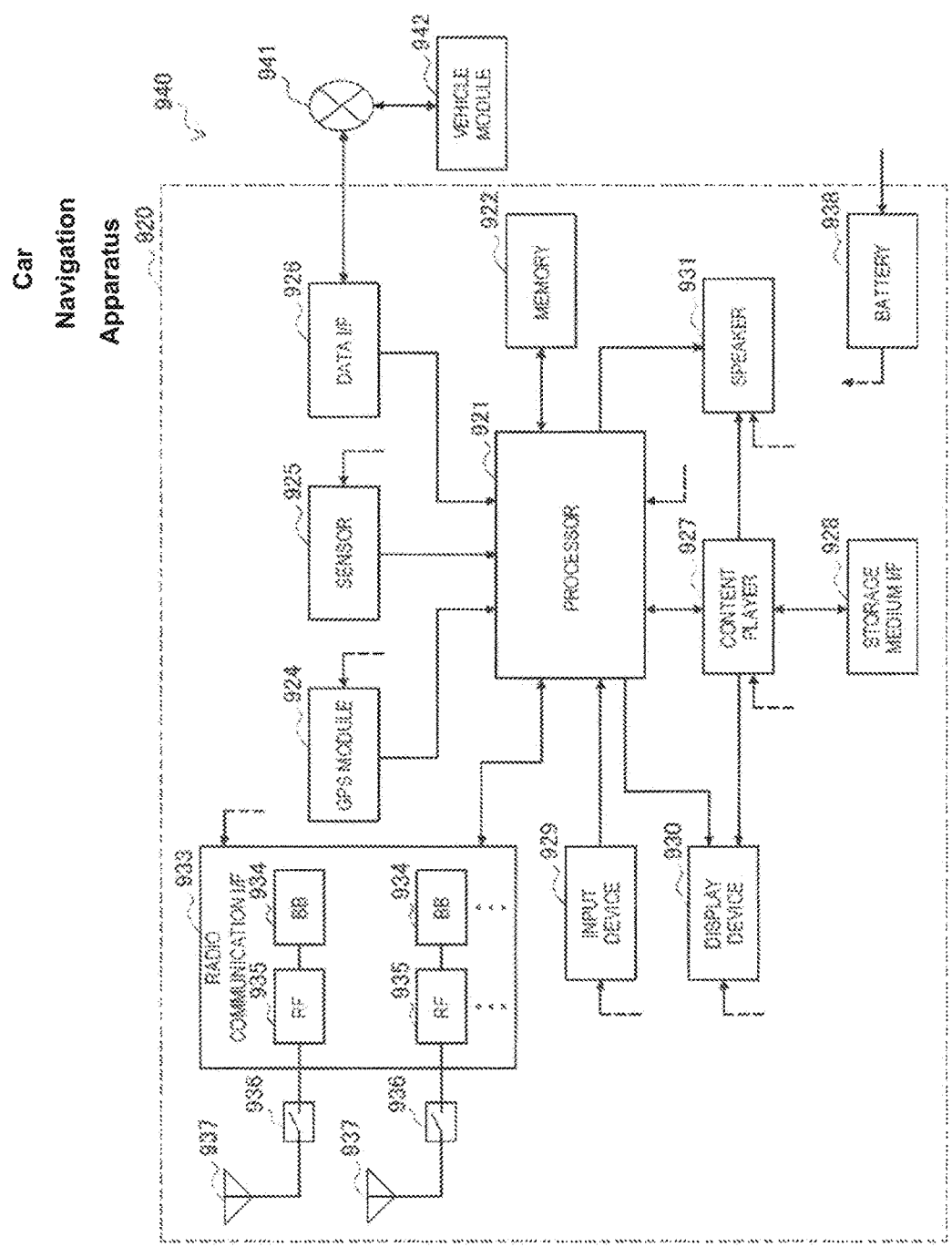
FIG. 26 is a block diagram illustrating an example of a schematic configuration of an car navigation device to which the technology of the present disclosure may be applied.

FIG. 26 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sounds for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 26. Although FIG. 26 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 26, the car navigation apparatus 920 may include the multiple antennas 937. Although FIG. 26 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 26 via feeder lines that are partially shown as dash lines in FIG. 26. The battery 938 accumulates power supplied from the vehicle.

In the car navigation apparatus 920 shown in FIG. 26, the transceiving unit 203 described with reference to FIG. 9 may be implemented by the radio communication interface 933. At least a part of the functions may also be implemented by the processor 921. For example, the processor 921 may perform acquisition of the configuration information and data transmission by performing the functions of the acquisition unit 201 and the generation unit 202.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2700 shown in FIG. 27) from a storage medium or network, wherein the computer is capable of implementing various functions when installed with various programs.

Figure 27:
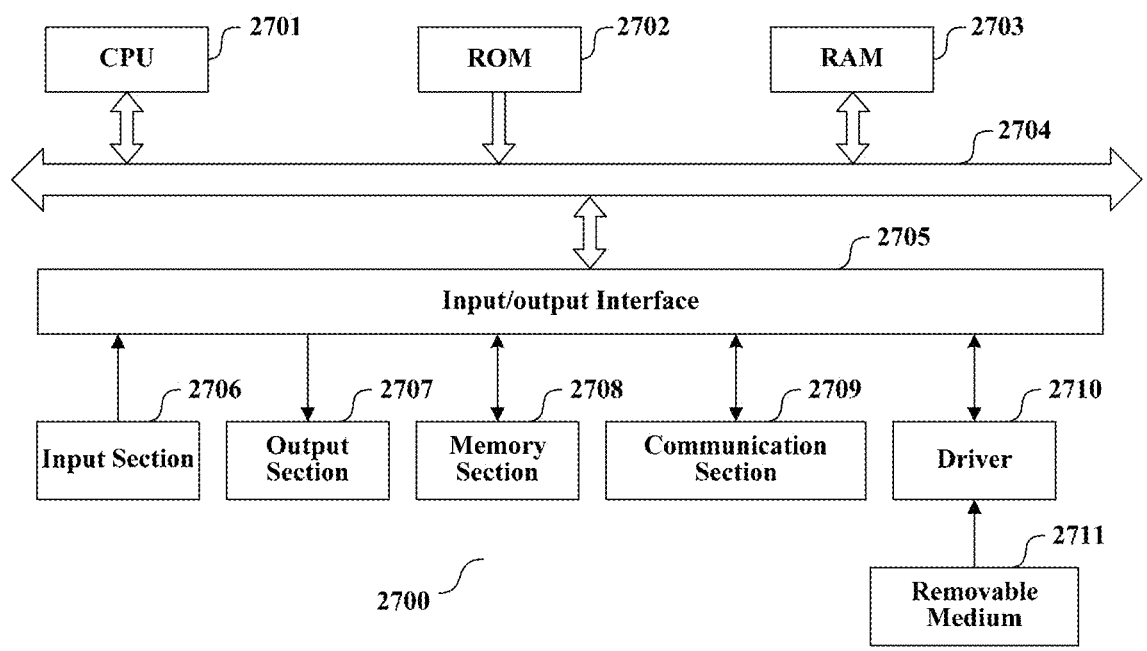
FIG. 27 is a block diagram of an exemplary block diagram illustrating the structure of a general purpose personal computer capable of realizing the method and/or device and/or system according to the embodiments of the present disclosure.

In FIG. 27, a central processing unit (CPU) 2701 executes various processing according to a program stored in a read-only memory (ROM) 2702 or a program loaded to a random access memory (RAM) 2703 from a memory section 2708. The data needed for the various processing of the CPU 2701 may be stored in the RAM 2703 as needed. The CPU 2701, the ROM 2702 and the RAM 2703 are linked with each other via a bus 2704. An input/output interface 2705 is also linked to the bus 2704.

The following components are linked to the input/output interface 2705: an input section 2706 (including keyboard, mouse and the like), an output section 2707 (including displays such as a cathode ray tube (CRT), a liquid crystal display (LCD), a loudspeaker and the like), a memory section 2708 (including hard disc and the like), and a communication section 2709 (including a network interface card such as a LAN card, modem and the like). The communication section 2709 performs communication processing via a network such as the Internet. A driver 2710 may also be linked to the input/output interface 2705, if needed. If needed, a removable medium 2711, for example, a magnetic disc, an optical disc, a magnetic optical disc, a semiconductor memory and the like, may be installed in the driver 2710, so that the computer program read therefrom is installed in the memory section 2708 as appropriate.

In the case where the foregoing series of processing is achieved through software, programs forming the software are installed from a network such as the Internet or a memory medium such as the removable medium 2711.

It should be appreciated by those skilled in the art that the memory medium is not limited to the removable medium 2711 shown in FIG. 27, which has program stored therein and is distributed separately from the apparatus so as to provide the programs to users. The removable medium 2711 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2702 and the memory section 2708 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for a network control terminal in wireless communications, the electronic apparatus comprising:
    processing circuitry configured to
    determine a division manner of transmission resources for the wireless communications in a predetermined domain, divided transmission resources being used for initial data transmission of a network node and data re-transmission of the network node, respectively;
    generate configuration information containing information on the division manner;
    transmit the configuration information to a network node; and
    receive initial transmission data in the initial data transmission and re-transmission data in the data re-transmission from the network node on the divided transmission resources based on the division manner,
    wherein the transmission resources for the initial data transmission of the network node and the transmission resources for the data re-transmission of the network node are distributed adjacent to each other in a time domain,
    wherein the re-transmission data comprises the initial transmission data, and
    wherein the initial data transmission and the data re-transmission are received on a same frequency domain.

2. The electronic apparatus according to claim 1, wherein the predetermined domain comprises one of the time domain, a frequency domain, and a code domain.

3. The electronic apparatus according to claim 1, further comprising:
    a transceiver, configured to transmit the configuration information to the network node, wherein the transceiver is configured to perform the transmitting via one of the following:
system information broadcast on a downlink share channel (DL-SCH), and broadcast channel (BCH).

4. The electronic apparatus according to claim 1, wherein the predetermined domain is the time domain, and the processing circuitry is configured to divide time-frequency resources into a plurality of double windows in the time domain, each double window comprising a transmission window for the initial data transmission of the network node and a back-off window for the data re-transmission of the network node, wherein the back-off window is used for data re-transmission by the network node whose transmission fails in the transmission window of a current double window.

5. The electronic apparatus according to claim 4, wherein the back-off window is further used for data re-transmission by the following network nodes: at least a part of network nodes whose re-transmission fails in the back-off window of a previous double window.

6. The electronic apparatus according to claim 4, wherein the processing circuitry is further configured to adjust a size of the back-off window according to at least one of: the number of network nodes that are to perform data re-transmission in the current back-off window, and requirements of the network nodes.

7. The electronic apparatus according to claim 4, wherein the processing circuitry is further configured to determine configuration of a minimum time-frequency resource unit in the transmission window and the back-off window, wherein the network node randomly selects the minimum time-frequency resource unit in the transmission window to perform the initial data transmission or randomly selects the minimum time-frequency resource unit in the back-off window to perform the data re-transmission.

8. The electronic apparatus according to claim 7, wherein the processing circuitry is configured to generate, according to a demodulation result for the data from the network node, indication information specific to a group of network nodes, to notify the network nodes in the group of network nodes of whether data transmission is successful, wherein the network nodes utilizing the same minimum time-frequency resource unit to perform the data transmission constitute the group of network nodes, wherein
the processing circuitry generates indication information NACK specific to the group of network nodes and indicating that the data transmission is unsuccessful, if there is a network node whose data is not demodulated successfully in the group of network nodes; and
the processing circuitry generates indication information ACK specific to the group of network nodes and indicating that the data transmission is successful, if there is no network node whose data is not demodulated successfully in the group of network nodes.

9. The electronic apparatus according to claim 8, wherein as for a group of network nodes whose data transmission in the back-off window is unsuccessful, the processing circuitry is further configured to generate a maximum back-off window size for the group of network nodes, the maximum back-off window size indicating the maximum number of back-off windows for which the network node in the group of network nodes is capable of backing off.

10. The electronic apparatus according to claim 9, wherein the maximum back-off window size is positively correlated to the number of the network nodes whose data transmission in the back-off window is unsuccessful.

11. A network node in wireless communications with an electronic apparatus, the network node comprising:
processing circuitry configured to:
receive, from the electronic apparatus, configuration information containing information on a division manner of transmission resources for the wireless communications in a predetermined domain, wherein divided transmission resources are used for initial data transmission of the network node and data re-transmission of the network node, respectively, and the transmission resources for the initial data transmission of the network node and the transmission resources for the data re-transmission of the network node are distributed adjacent to each other in a time domain; and
perform the initial data transmission and the data re-transmission on the divided transmission resources based on the division manner,
wherein re-transmission data in the data re-transmission comprises initial transmission data in the initial data transmission, and
wherein the initial data transmission and the data re-transmission are received on a same frequency domain.

12. The electronic apparatus according to claim 11, wherein the predetermined domain is the time domain, time-frequency resources are divided into a plurality of double windows in the time domain, each double window comprises a transmission window for the initial data transmission of the network node and a back-off window for the data re-transmission of the network node, and the processing circuitry randomly selects a minimum time-frequency resource unit in the transmission window to perform the initial data transmission or randomly selects a minimum time-frequency resource unit in the back-off window to perform the data re-transmission.

13. The electronic apparatus according to claim 12, wherein the processing circuitry is configured to:
in the case that the initial data transmission in the transmission window of a current double window fails, perform the data re-transmission in the back-off window of the current double window, or back off to perform the data re-transmission in a back-window after a period of time elapses.

14. The electronic apparatus according to claim 13, wherein the processing circuitry is configured to determine, based on information on a maximum back-off window size from a network control terminal, the back-off window to use.

15. The electronic apparatus according to claim 14, wherein the processing circuitry is configured to: select the number of back-off windows to back off within a range of the maximum back-off window size randomly, or select the number of back-off windows to back off according to a priority level of the network node.

16. The electronic apparatus according to claim 15, wherein the priority level of the network node is increased with the increase of the number of re-transmissions, and the processing circuitry is configured to select, for the network node having a higher priority level, a smaller number of back-off windows to back off.

17. The electronic apparatus according to claim 13, wherein the processing circuitry is configured to back off to a next back-off window of the current back-off window to perform the data re-transmission.

18. The electronic apparatus according to claim 11, wherein the processing circuitry is further configured to include requirement information of the network node in a data packet transmitted from the network node to a network control terminal, so that the network control terminal adjusts the division manner according to the requirement information.

19. A method for a network control terminal in wireless communications, the method comprising:
determining a division manner of transmission resources for the wireless communications in a predetermined domain, divided transmission resources being used for initial data transmission of a network node and data re-transmission of the network node, respectively;
generating configuration information containing information on the division manner;

transmitting the configuration information to a network node; and receiving initial transmission data in the initial data transmission and re-transmission data in the data re-transmission from the network node on the divided transmission resources based on the division manner, wherein the transmission resources for the initial data transmission of the network node and the transmission resources for the data re-transmission of the network node are distributed adjacent to each other in a time domain, wherein the re-transmission data comprises the initial transmission data, and wherein the initial data transmission and the data re-transmission are received on a same frequency domain.

* * * * *